US012685257B2

(12) United States Patent
Chen et al.

(10) Patent No.: US 12,685,257 B2
(45) Date of Patent: Jul. 21, 2026

(54) CUTTING MECHANISM HAVING CUTTER DISC ASSEMBLY AND FAN BLADE FOR MOWER

(71) Applicant: SHENZHEN ZONGGUAN INNOVATION CO., LTD., Shenzhen (CN)

(72) Inventors: Yiqi Chen, Shenzhen (CN); Shuai Gan, Shenzhen (CN); Zhenkai Wu, Shenzhen (CN)

(73) Assignee: SHENZHEN ZONGGUAN INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 19/333,826

(22) Filed: Sep. 19, 2025

(65) Prior Publication Data

US 2026/0013427 A1 Jan. 15, 2026

Related U.S. Application Data

(63) Continuation of application No. PCT/CN2024/079986, filed on Mar. 4, 2024.

(30) Foreign Application Priority Data

Mar. 20, 2023 (CN) ......................... 202320561583.X
Jun. 19, 2023 (CN) ......................... 202321575874.0

(Continued)

(51) Int. Cl.
*A01D 34/73* (2006.01)
*A01D 43/077* (2006.01)
*A01D 101/00* (2006.01)

(52) U.S. Cl.
CPC ......... *A01D 34/733* (2013.01); *A01D 43/077* (2013.01); *A01D 2101/00* (2013.01)

(58) Field of Classification Search
CPC . A01D 34/733; A01D 43/077; A01D 2101/00
See application file for complete search history.

(56) References Cited

U.S. PATENT DOCUMENTS 3,705,484 A * 12/1972 Hjelmquist ............ A01D 34/71
56/320.2
4,407,112 A * 10/1983 Shepherd ............. A01D 43/077
56/320.2

(Continued)

FOREIGN PATENT DOCUMENTS

CN 217011839 U * 7/2022 ............. A01D 75/18
CN 219555673 U * 8/2023 ............. Y02P 60/12

(Continued)

*Primary Examiner* — Arpad Fabian-Kovacs
(74) *Attorney, Agent, or Firm* — BAYES PLLC

(57) ABSTRACT

A cutting mechanism for a mower is provided, including a cutter disc, a shroud detachably connected to the cutter disc to define an internal cavity, a power component, a cutting knife, and a fan blade. The cutting knife and the fan blade are disposed in the internal cavity and connected to the output shaft of the power component. The fan blade, when driven by the output shaft, generates an airflow that draws air through a suction inlet into the internal cavity while the cutting knife rotates to perform cutting.

15 Claims, 17 Drawing Sheets

(30)        Foreign Application Priority Data

Oct. 10, 2023   (CN) ......................... 202322723487.3
Oct. 10, 2023   (CN) ......................... 202322725058.X

(56)                   References Cited

U.S. PATENT DOCUMENTS

| | | | | | |
|---|---|---|---|---|---|
| 4,711,077 | A | * | 12/1987 | Kutsukake ............. | A01D 34/81 |
| | | | | | 56/255 |
| 4,967,546 | A | * | 11/1990 | Forbush ............... | A01D 42/005 |
| | | | | | 56/255 |
| 5,020,309 | A | * | 6/1991 | Hopkins .............. | A01D 42/005 |
| | | | | | 241/292.1 |
| 5,560,188 | A | * | 10/1996 | Murakawa ........... | A01D 43/077 |
| | | | | | 56/13.3 |
| 5,870,889 | A | * | 2/1999 | Togoshi ............... | A01D 43/077 |
| | | | | | 56/203 |
| 5,873,225 | A | * | 2/1999 | Schaedler ............ | A01D 43/077 |
| | | | | | 56/16.9 |
| 7,069,712 | B2 | * | 7/2006 | Bauer .................... | A01D 34/71 |
| | | | | | 56/320.2 |
| 10,188,032 | B2 | * | 1/2019 | Ito .......................... | A01D 34/81 |
| 10,426,084 | B2 | * | 10/2019 | Ito .......................... | A01D 34/78 |
| 10,694,673 | B2 | * | 6/2020 | Berglund ............ | A01D 43/077 |

FOREIGN PATENT DOCUMENTS

| | | | | | | |
|---|---|---|---|---|---|---|
| DE | 3047058 | A1 | * | 7/1982 | ........... | A01D 43/077 |
| FR | 2460600 | A1 | * | 1/1981 | ........... | A01D 43/077 |
| JP | S6443118 | A | * | 2/1989 | ............. | A01D 34/70 |
| JP | H08182242 | A | * | 7/1996 | ............... | H02K 5/10 |
| JP | 2009050222 | A | * | 3/2009 | ............. | A01D 34/64 |
| JP | 2014060940 | A | * | 4/2014 | ........... | A01D 34/005 |
| JP | 2015092846 | A | * | 5/2015 | ............. | A01D 34/64 |
| WO | WO-2024193338 | A1 | * | 9/2024 | ........... | A01D 43/077 |

* cited by examiner

Up

Left      Rear

Front      Right

Down

Up

Left     Rear

Front     Right

Down

A-A

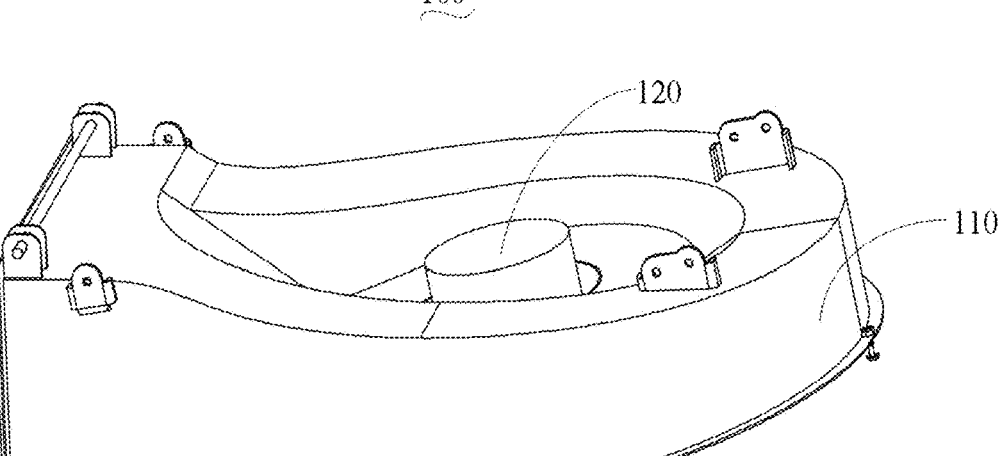
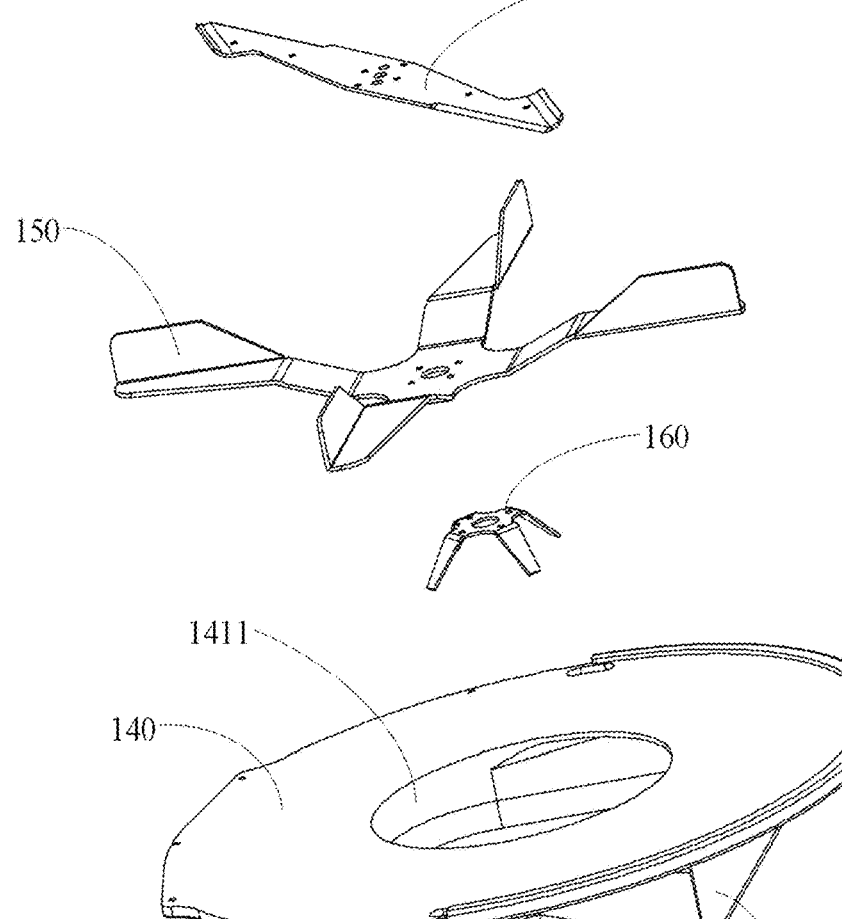
FIG. 23

140

110
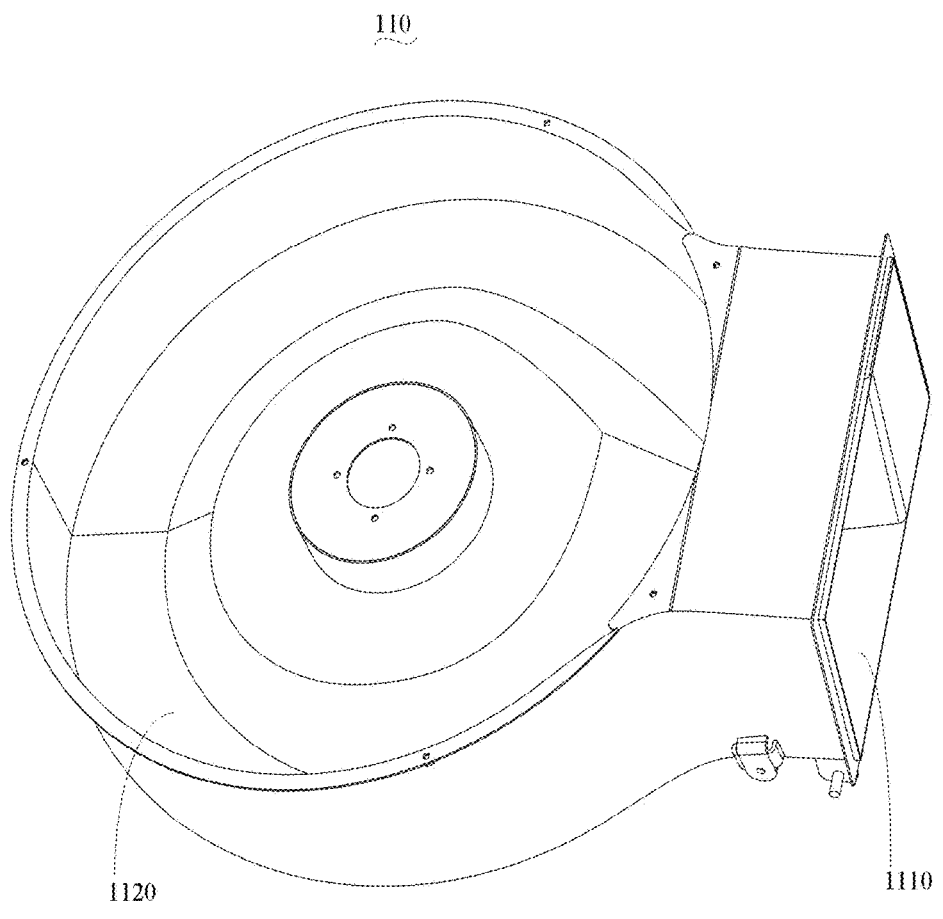
1120
1110
1120 FIG. 27 1110
10
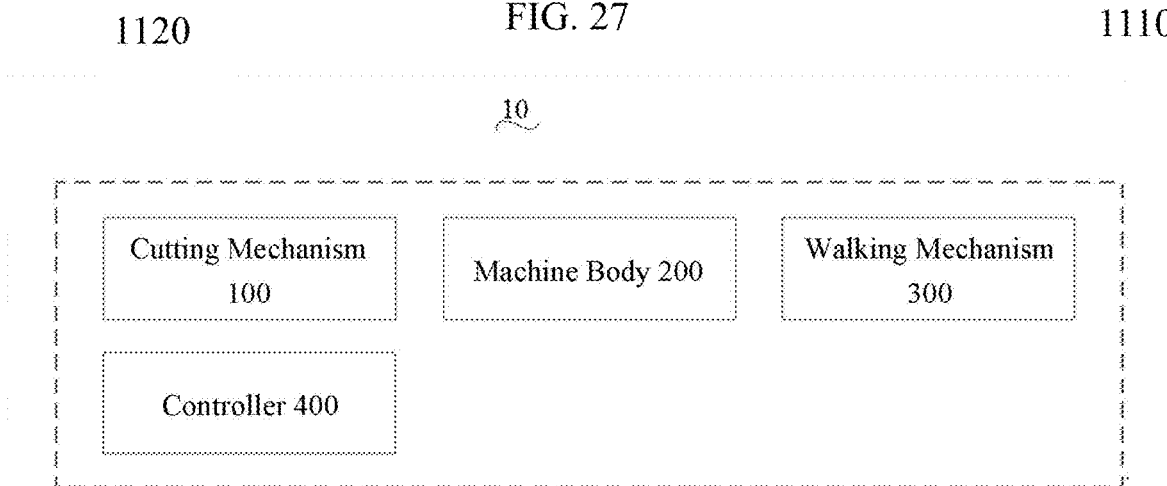
| Cutting Mechanism 100 | Machine Body 200 | Walking Mechanism 300 |
| Controller 400 | | |
FIG. 28

B 192  191
$\underbrace{\qquad}$
190

140          110

CUTTING MECHANISM HAVING CUTTER DISC ASSEMBLY AND FAN BLADE FOR MOWER

CROSS-REFERENCE TO RELATED APPLICATION

This application is a continuation of International Application No. PCT/CN2024/079986, filed on Mar. 4, 2024, which claims the benefit of priority to Chinese Patent Application No. 202320561583.X, filed on Mar. 20, 2023, to Chinese Patent Application No. 202321575874.0, filed on Jun. 19, 2023, to Chinese Patent Application No. 202322725058.X, filed on Oct. 10, 2023, and to Chinese Patent Application No. 202322723487.3, filed on Oct. 10, 2023. The contents of these applications are hereby incorporated by reference in their entireties.

TECHNICAL FIELD

The present disclosure relates to the technical field of mowers, and in particular, to a cutter disc assembly, quick-detach leaf suction cover, fan blade, leaf suction device, cutting mechanism for a mower, and the mower including the same.

BACKGROUND

The mowing mechanisms of mowers on the market are mainly divided into two categories: rotary blade type and reel blade type. The rotary blade type uses high-speed rotating blades on the cutter disc to impact and cut grass. The reel blade type uses a drum-type reel blade and a bottom blade to form a double-edged scissor action, and the grass is rolled between the reel blade and fixed blade to achieve cutting.

The mower blade mainly has two functions: one is mowing, and the other is grass discharge (or shredding). Mowing is achieved by the front edge of the blade. The raised rear edge of the blade can act as an axial-flow fan when the blade rotates (or serrated shredding), and the airflow generated by the axial-flow fan gathers the cut grass leaves to the grass discharge port.

However, when the existing blade is used in places with fallen leaves or scattered shredded grass on the sidewalk at the edge of the lawn, the airflow generated by the blade is difficult to effectively gather the fallen leaves or shredded grass to the grass discharge port, and it is common to miss fallen leaves and shredded grass.

SUMMARY

The main purpose of the present disclosure is to provide a cutter disc assembly, quick-detach leaf suction cover, fan blade, leaf suction device, cutting mechanism for a mower, and the mower including the same.

The cutter disc assembly for a mower includes: a cutter disc mounting body, including a bottom plate and a mounting plate, the bottom plate having a through hole, the bottom plate and the mounting plate being connected by multiple spaced connecting ribs, a hollow portion being formed between adjacent connecting ribs; multiple centrifugal fan blades, the centrifugal fan blades being arranged on a top surface of the bottom plate and corresponding to the connecting ribs; and multiple blades, arranged along edges of the bottom plate's bottom surface at intervals.

Also provided is a quick-detach leaf suction cover, including: a bottom plate and a cover body. The bottom plate is configured to connect to a mower. The bottom plate is provided with a through hole. The cover body is fastened around the periphery of the through hole. The cover body includes a leaf inlet and a leaf outlet. The leaf inlet is configured to connect to a leaf suction pipe. The leaf outlet corresponds to the through hole, and the suction fan of the mower is configured to direct shredded leaves through the leaf suction pipe, flowing from the leaf inlet to the leaf outlet, and entering the grass outlet of the mower from the leaf outlet.

Also provided is a fan blade for a mower, including a bottom plate, a fan blade body, and a reinforcing member. The bottom plate includes a fixed portion and a mounting portion. The mounting portion extends outward along an end of the fixed portion. The width of the mounting portion is greater than the fixed portion, the fan blade body is arranged on the mounting portion, and the reinforcing member is arranged tightly against a side of the fan blade body and is fixedly connected to the fan blade body.

Also provided is a cutting mechanism, including:
a cutter disc;
a shroud, the shroud being detachably connected to the cutter disc and enclosing the cutter disc to form an internal cavity, at least one of the cutter disc or the shroud forming a suction inlet communicating with the internal cavity;
a power component, the power component being mounted on the cutter disc, and the power component having an output shaft extending into the internal cavity;
a cutting knife, the cutting knife being housed within the internal cavity and connected to the output shaft, for rotating under the drive of the output shaft; and
a fan blade, the fan blade being housed within the internal cavity and detachably connected to the cutting knife or the output shaft, the fan blade being configured to rotate under the drive of the output shaft to form a driving airflow from the suction inlet towards the internal cavity.

BRIEF DESCRIPTION OF DRAWINGS

FIG. 23 is an exploded schematic diagram of the cutting mechanism provided in some implementations of the present disclosure.

FIG. 27 is a structural schematic diagram of the cutter disc provided in some implementations of the present disclosure.

FIG. 28 is a schematic diagram of the composition of the mower provided in some implementations of the present disclosure.

DETAILED DESCRIPTION

Figure 1:
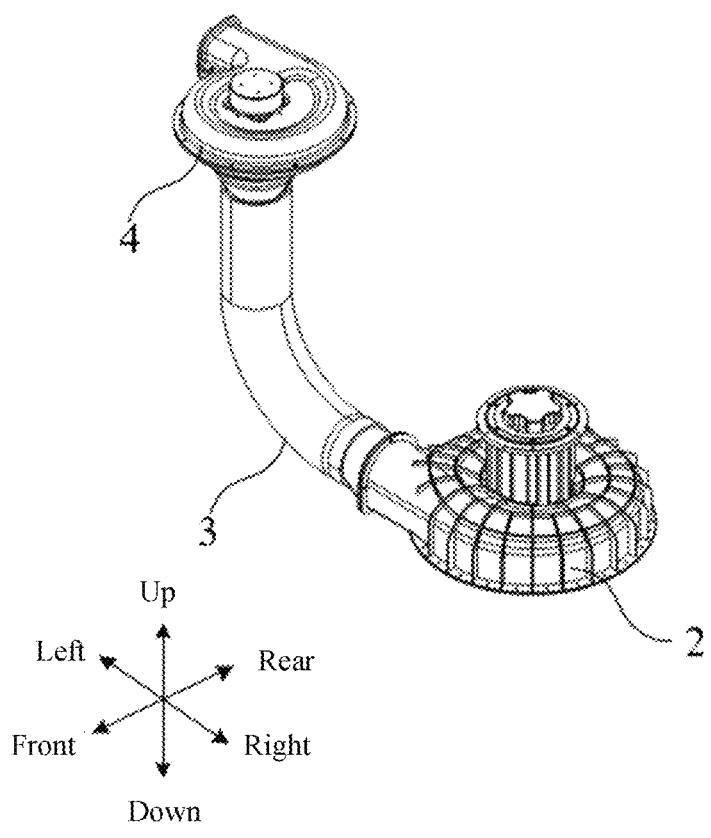
FIG. 1 is a structural schematic diagram according to some implementations of the present disclosure.

To facilitate understanding of the present disclosure, the following provides a more detailed description of the present disclosure in conjunction with the drawings and specific implementations. Some implementations of the present disclosure are shown in the drawings. However, the present disclosure can be implemented in many different forms and is not limited to the implementations described in this specification. On the contrary, the purpose of providing these implementations is to make the disclosure of the present disclosure more thorough and comprehensive.

It should be noted that, unless otherwise defined, all technical and scientific terms used in this specification have the same meaning as commonly understood by those skilled in the art to which the present disclosure belongs. The terms used in the specification of the present disclosure are only for the purpose of describing specific implementations and are not intended to limit the present disclosure. The term "and/or" as used in this specification includes any and all combinations of one or more of the associated listed items.

FIGS. 1 to 5 show some implementations of the present disclosure for a mower. The cutter disc assembly includes: a cutter disc mounting body 1 (shown in FIG. 2), including a bottom plate 11 and a mounting plate 12, the bottom plate 11 having a through hole 111, the bottom plate 11 and the mounting plate 12 being connected by multiple spaced connecting ribs 13, a hollow portion 14 being formed between adjacent connecting ribs 13; and also including multiple blades 112, the blades are arranged at intervals along the edge of the bottom surface of the bottom plate 11. The cutter disc assembly also includes multiple centrifugal fan blades 113. The centrifugal fan blades 113 are arranged on the top surface of the bottom plate 11 and correspond to the connecting ribs 13. The centrifugal fan blades 113 are vertically mounted on the top surface.

In the present disclosure, the centrifugal fan blades 113 can increase the airflow generated by the cutter disc mounting body 1 during rotation. Utilizing the principle of central air intake of the centrifugal fan blades 113, air enters from the through hole 111 of the bottom plate 11 and exits from the hollow portion 14. The hollow portion 14 between the centrifugal fan blades 113 can generate a larger negative pressure area, thereby forming a negative pressure suction effect at the center, which can lift the shredded grass and leaves from the ground and further gather the shredded grass and leaves to the grass discharge port 41 through the suction fan 4. This can avoid the problem that the airflow generated by the blades 112 is insufficient to effectively gather the shredded grass and leaves to the grass discharge port 41.

Figure 2:
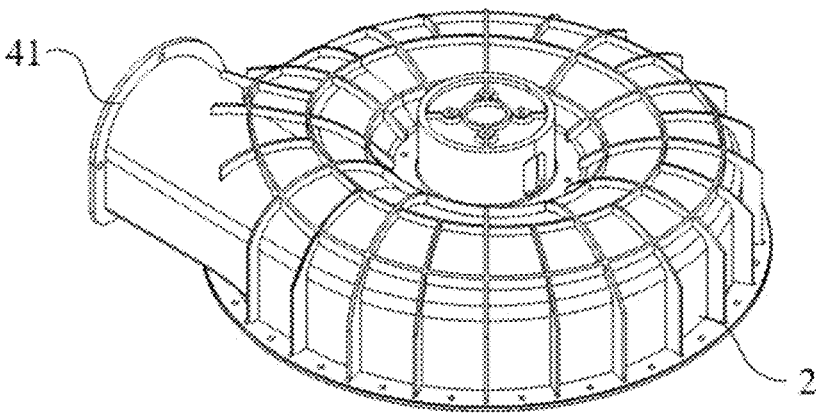
FIG. 2 is a structural schematic diagram of the cutter disc cover according to some implementations of the present disclosure.
Figure 3:
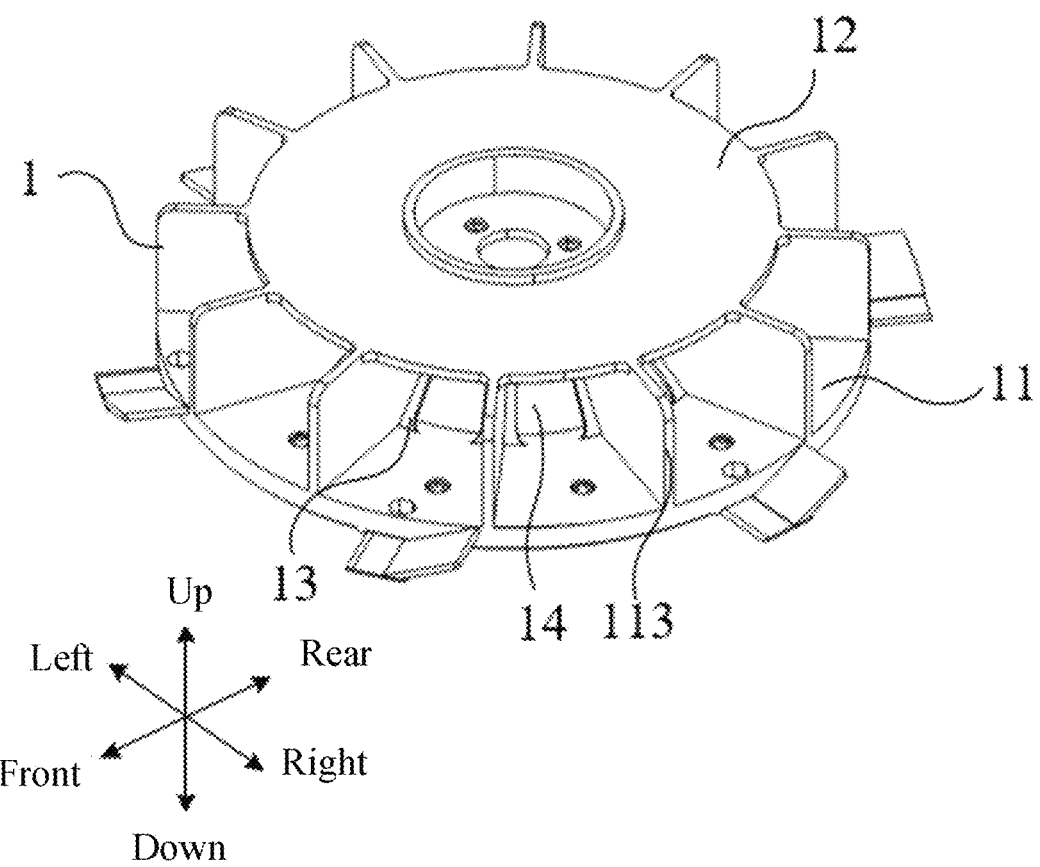
FIG. 3 is a structural schematic diagram of the cutter disc assembly according to some implementations of the present disclosure.

Further, as shown in FIGS. 1 and 2, the cutter disc assembly also includes a cutter disc cover 2, a pipe 3, and a suction fan 4. The suction fan 4 communicates with the hollow portion 14 and is configured to provide suction. The cutter disc cover 2 encloses the cutter disc mounting body 1 and the blades 112. One end of the pipe 3 communicates with the cutter disc cover 2, and the other end communicates with the suction fan 4. The cutter disc cover 2 can provide protection to avoid exposure of the blades 112 and also prevent the splashing of shredded grass and leaves.

The blades 112 are arranged at intervals along the edge of the bottom surface of the bottom plate 11. The blades 112 cut fallen leaves and grass. While the blades 112 cut the fallen leaves and grass, the suction fan 4 is started to generate suction, and the suction draws the shredded grass and leaves cut by the blades 112 from the through hole 111 and out through the hollow portion 14, thereby gathering the shredded grass and leaves from the cutter disc assembly to the grass discharge port 41. This can avoid the problem that the airflow generated by the blades 112 is insufficient to effectively gather the shredded grass and leaves to the grass discharge port 41.

In some implementations, the cutter disc cover 2 is in a volute shape. This facilitates guiding the shredded grass and leaves into the pipe 3.

In some implementations, the bottom plate 11 is annular, and the mounting plate 12 is in a circular plate structure.

Figure 4:
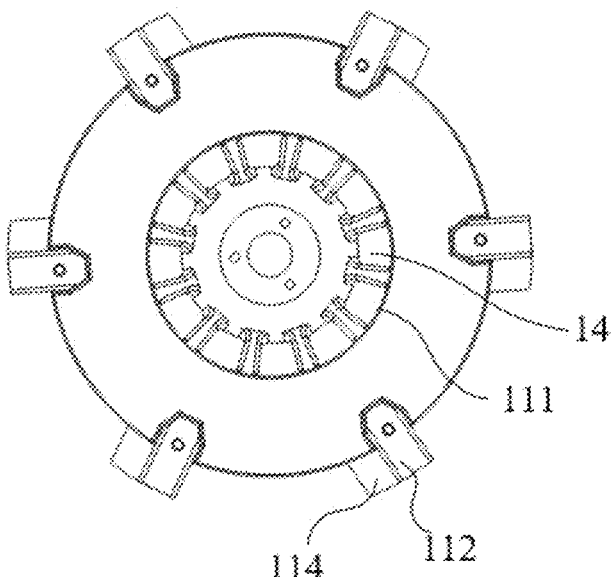
FIG. 4 is a bottom view structural schematic diagram of the cutter disc assembly according to some implementations of the present disclosure.

Further, as shown in FIG. 4, the side edge of the bottom plate 11 is also provided with auxiliary fan blades 114. The auxiliary fan blades 114 increase the airflow generated by the cutter disc mounting body 1 during rotation.

In some implementations, the auxiliary fan blades 114 are in contact with the blades 112 and are arranged at a preset angle with respect to the blades 112. The auxiliary fan blades 114 can be integrally formed with the blades 112. The blades 112 can be arranged horizontally, and the auxiliary fan blades 114 extend upward at a preset angle. The preset angle between the blades 112 and the auxiliary fan blades 114 is within a range from 5° to 45° (both inclusive), for example, 30°.

The outer blades 112 perform grass cutting, and the auxiliary fan blades 114 provide part of the lift. The lifting airflow drives the shredded grass and leaves upward, and the centrifugal fan blades 113 discharge air from the hollow portion 14 around the periphery, then blow the shredded grass and leaves out of the grass discharge port 41. Compared with traditional cutter discs, the present disclosure utilizes the dual effect of the auxiliary fan blades 114 and the centrifugal fan blades 113 to exhaust and discharge grass, increasing the wind speed for grass discharge and avoiding grass clogging.

In some implementations, the connecting ribs 13 extend and taper from one end of the bottom plate 11 to the other. This can increase the structural strength of the cutter disc mounting body 1.

Figure 5:
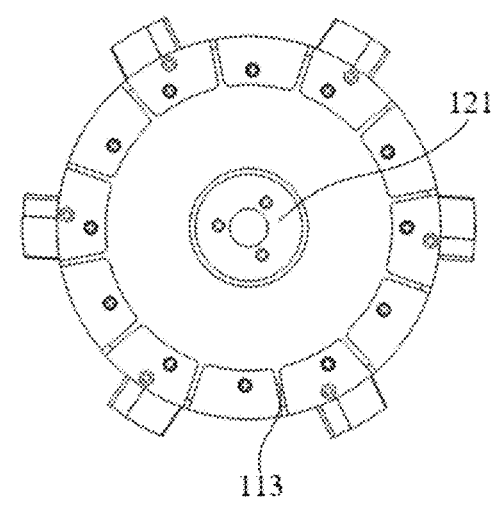
FIG. 5 is a top view structural schematic diagram of the cutter disc assembly according to some implementations of the present disclosure.
Figure 6:
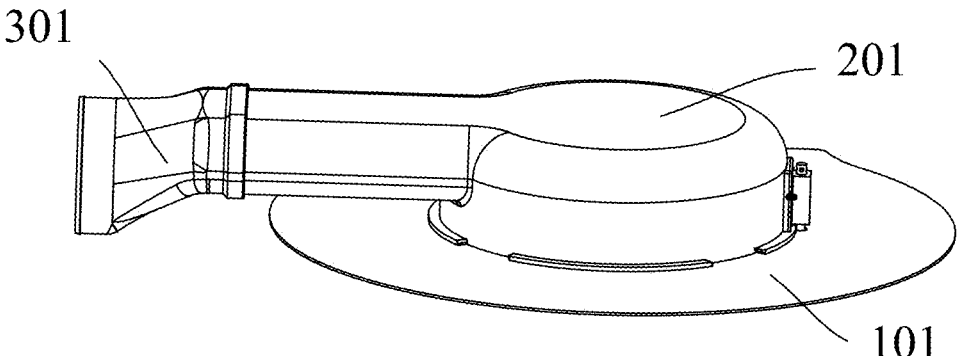
FIG. 6 is a structural schematic diagram of some implementations of the present disclosure.

In some implementations, as shown in FIG. 5, the central part of the mounting plate 12 is formed with a mounting hole 121 for fixing the cutter disc mounting body 1. The mounting hole 121 can be connected to a drive motor, and the drive motor drives the cutter disc mounting body 1 to rotate to perform the mowing task.

Based on the same concept, the present disclosure also provides a mower including the above cutter disc assembly.

Thus, the present disclosure discloses a cutter disc assembly for a mower. In the present disclosure, the blades 112 are arranged at intervals along the edge of the bottom surface of the bottom plate 11. The blades 112 cut fallen leaves and grass. While the blades 112 cut the fallen leaves and grass, the suction fan 4 is started to generate suction, and the suction draws the shredded grass and leaves cut by the blades 112 from the through hole 111 and out through the hollow portion 14, thereby discharging the shredded grass and leaves from the cutter disc assembly to the grass discharge port 41. This can avoid the problem that the airflow generated by the blades 112 is insufficient to effectively gather the shredded grass and leaves to the grass discharge port 41.

Figure 7:
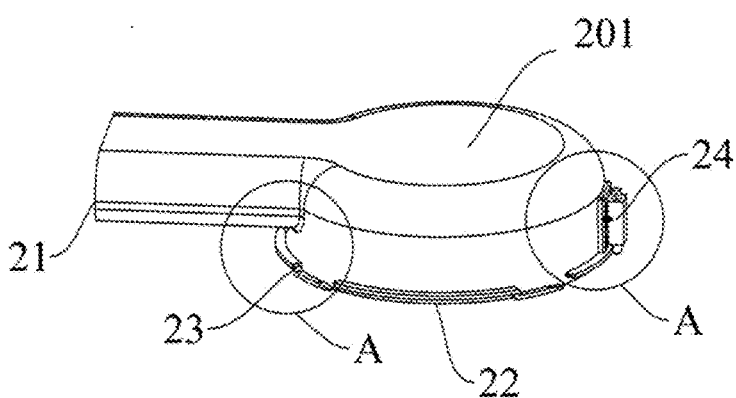
FIG. 7 is a structural schematic diagram of the cover body according to some implementations of the present disclosure.
Figure 8:
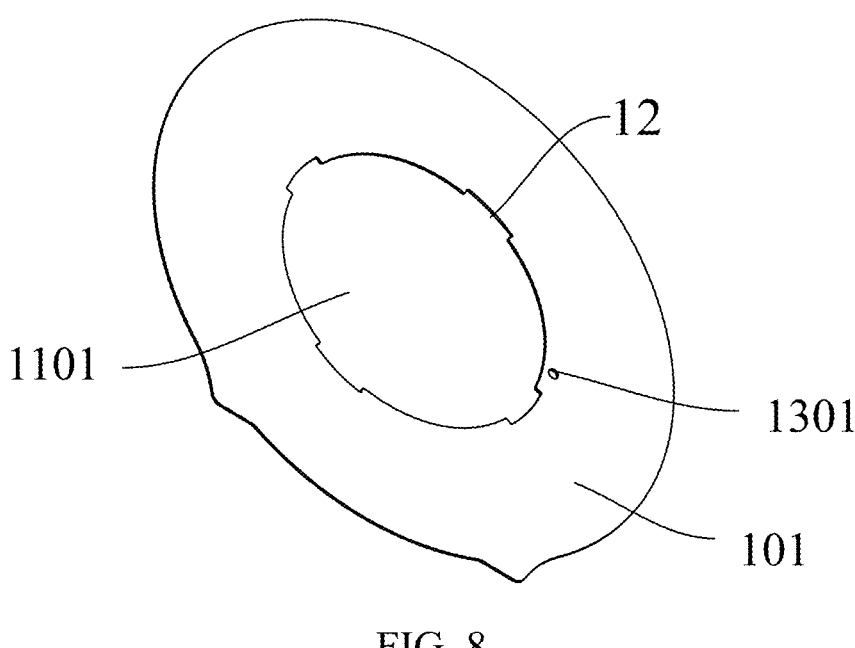
FIG. 8 is a structural schematic diagram of the bottom plate according to some implementations of the present disclosure.

FIGS. 6 to 12 show implementations of the quick-detach leaf suction cover of the present disclosure, including a bottom plate 101 and a cover body 201. The bottom plate 101 is configured to connect to the mower 401. The bottom plate 101 can be connected to the mower 401 by a fastening assembly. As shown in FIG. 8, the bottom plate 101 is provided with a through hole 1101, and the cover body 201 is fastened around the periphery of the through hole 1101. As shown in FIG. 7, the cover body 201 includes a leaf inlet 21 and a leaf outlet 22. The leaf inlet 21 is configured to connect to a leaf suction pipe, and the leaf outlet 22 corresponds to the through hole 1101. The suction fan of the mower 401 is configured to direct shredded leaves through the leaf suction pipe, flowing from the leaf inlet 21 to the leaf outlet 22, and entering the grass outlet of the mower 401 from the leaf outlet 22. The cover body 201 and the bottom plate 101 can be separated and assembled, allowing switching between mowing and leaf suction modes, which is very convenient.

When collecting fallen leaves, the quick-detach cover is installed on the cutter disc frame, and the suction fan draws the fallen leaves through the suction pipe into the corresponding collection device. The quick-detach cover can both gather wind power and guide the fallen leaves to enter the collection device in a predetermined direction. When mowing, the cover body 201 can be removed for mowing.

In some implementations, the cover body 201 around the leaf outlet 22 is provided with multiple spaced fastening parts 23, and the bottom plate 101 around the through hole 1101 is provided with fastening grooves 1201 matching the fastening parts 23. The fastening parts 23 engage with the fastening grooves 1201 to fasten the cover body 201 to the bottom plate 101, making installation and removal of the cover body 201 and the bottom plate 101 convenient.

In some implementations, the fastening parts 23 can include multiple hooks extending away from the leaf outlet 22, and the fastening grooves 1201 are multiple openings and strip-shaped holes matching the hooks, with the openings and strip-shaped holes arranged alternately. The hooks are engaged with the lower side of the bottom plate 101 through the openings. By rotating the cover body 201, the hooks align with the strip-shaped holes. Pulling the cover body 201, the hooks are inserted into the strip-shaped holes, fastening the cover body 201 to the bottom plate 101. The installation is simple, quick, and firm. For removal, press and rotate the cover body 201 to align the hooks with the openings, then pull the cover body 201 to separate the cover body 201 and the bottom plate 101, making removal very quick.

Figure 9:
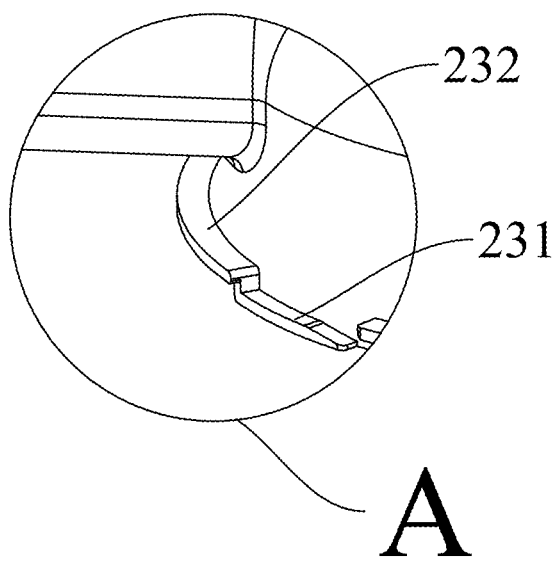
FIG. 9 is a partially enlarged structural schematic diagram of the fastening part at A in FIG. 7.

As shown in FIG. 9, in some implementations, the fastening parts 23 can include a first ridge 231 and a second ridge 232, the position of the second ridge 232 being higher than the first ridge 231. The fastening groove 12 matches the first ridge 231. The first ridge 231 is engaged by the fastening groove 12 to the lower side of the bottom plate 101. By rotating the cover body 201, the second ridge 232 covers the upper part of the bottom plate 101, fastening the cover body 201 to the bottom plate 101. The installation is simple, quick, and firm. For removal, rotate the cover body 201 to align the first ridge 231 with the fastening groove 12, then lift and pull the cover body 201 to separate the cover body 201 and the bottom plate 101, making removal very quick.

In some implementations, the length of the second ridge 232 is greater than the length of the fastening groove 12. When the second ridge 232 covers the upper part of the fastening groove 12, since the length of the second ridge 232 is greater than the length of the fastening groove 12, the cover body 201 will not drop, and the second ridge 232 just rests on both sides of the fastening groove 12, sealing the fastening groove 12, ensuring both the stability and the sealing of the fastening position.

In some implementations, the quick-detach cover is further provided with a locking assembly 24, the locking assembly 24 being configured to lock the position of the cover body 201 relative to the bottom plate 101, preventing relative rotation between the cover body 201 and the bottom plate 101, which could cause separation. The locking assembly 24 can be a buckle assembly or a pin assembly.

In some implementations, the locking assembly 24 is a buckle assembly, including a fixed plate and a buckle ring. One end of the buckle ring is arranged on the fixed plate and can rotate relative to the fixed plate. The fixed plate is fixed on the outer wall of the cover body 201, and the bottom plate 101 is provided with a matching hook piece corresponding to the buckle ring. By rotating the buckle ring, the other end of the buckle ring can hook onto the matching hook piece, locking the position of the cover body 201 relative to the bottom plate 101.

Figure 10:
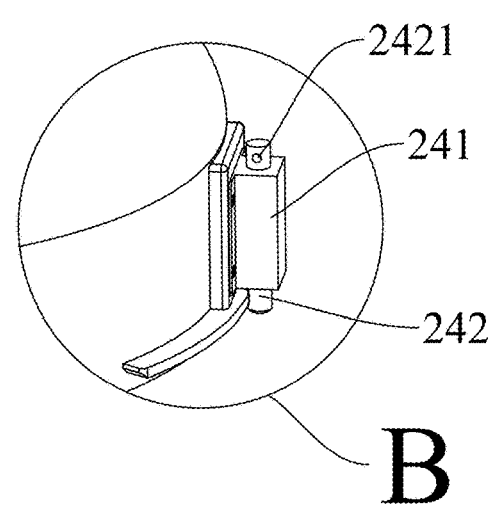
FIG. 10 is a partially enlarged structural schematic diagram of the locking assembly at B in FIG. 7.

As shown in FIG. 10, in some implementations, the locking assembly 24 is a pin assembly, including a fixed block 241 and a pin column 242. The pin column 242 is inserted through the fixed block 241 and can slide along the fixed block 241. The fixed block 241 is fixed on the outer wall of the cover body 201, and the bottom plate 101 is provided with a pin hole 1301 corresponding to the pin column 242. The pin column 242 is inserted in the pin hole 1301 to lock the position of the cover body 201 relative to the bottom plate 101, preventing relative rotation between the cover body 201 and the bottom plate 101 during use, which could cause separation, ensuring the stability of the quick-detach cover.

In some implementations, to prevent the pin column 242 from detaching from the fixed block 241 due to its own weight, the upper end of the pin column 242 is provided with a transverse hole 2421, and a limit pin is arranged in the transverse hole 2421. The limit pin allows the pin column 242 to rest on the fixed block 241, ensuring the stability of the pin assembly during use and making it more convenient to adjust the pin column 242 up and down.

Figure 11:
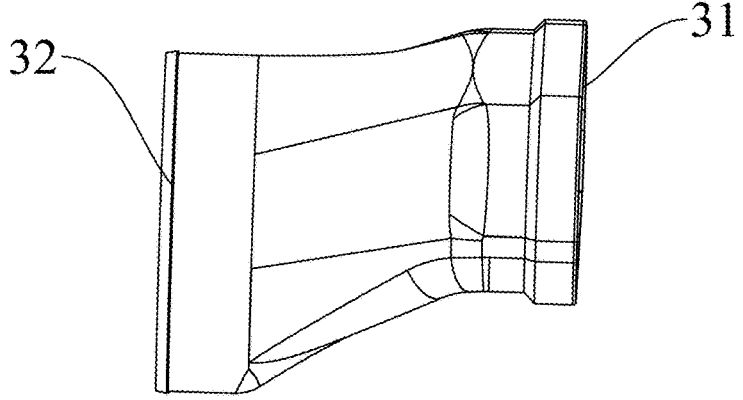
FIG. 11 is a structural schematic diagram of the adapter according to some implementations of the present disclosure.

As shown in FIG. 11, in some implementations, an adapter 301 is included, the adapter 301 being configured to connect the cover body 201 and the leaf suction pipe. In actual use, the outside of the cover body 201 also needs to be connected to the leaf suction pipe. The adapter 301 is provided to facilitate adaptation to leaf suction pipes of different sizes, ensuring the practicality of the quick-detach cover.

In some implementations, the internal connecting end 31 of the adapter 301 connects to the leaf inlet 21, and the external connecting end 32 of the adapter 301 connects to the leaf suction pipe. The structural size of the external connecting end 32 is larger than that of the internal connecting end 31. The larger size of the external connecting end 32 allows more fallen leaves to be sucked in per unit time, improving the efficiency of leaf suction.

Figure 12:
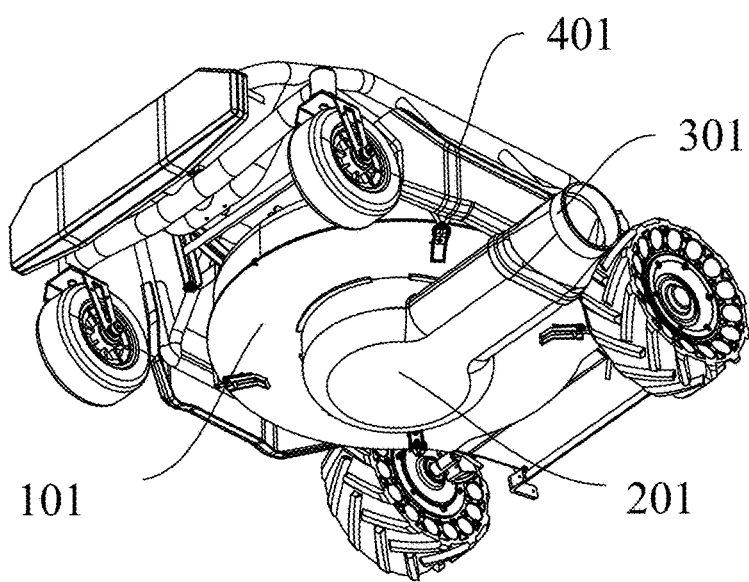
FIG. 12 is a structural schematic diagram of the mower according to some implementations of the present disclosure.
Figure 13:
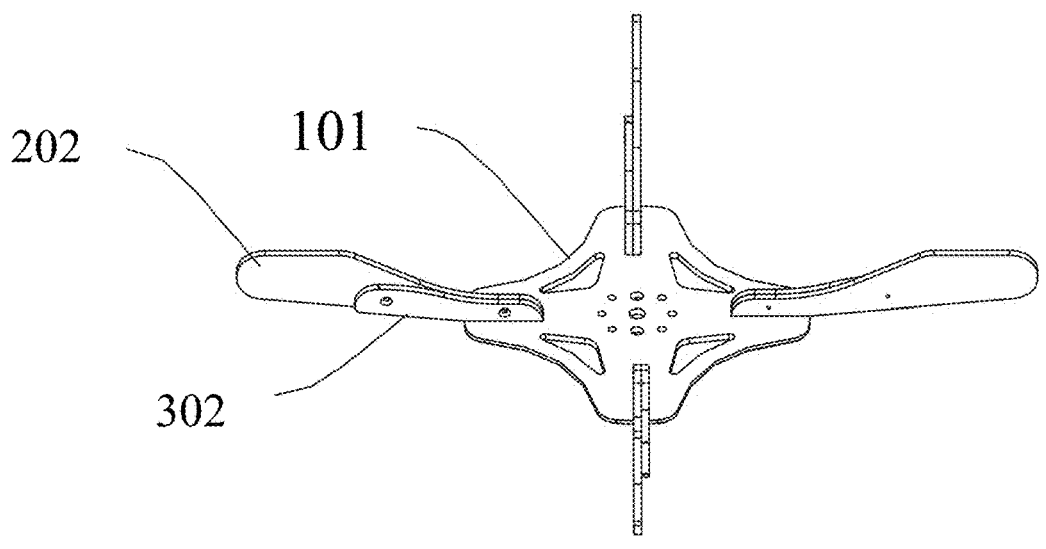
FIG. 13 is a structural schematic diagram of some implementations of the present disclosure.
Figure 14:
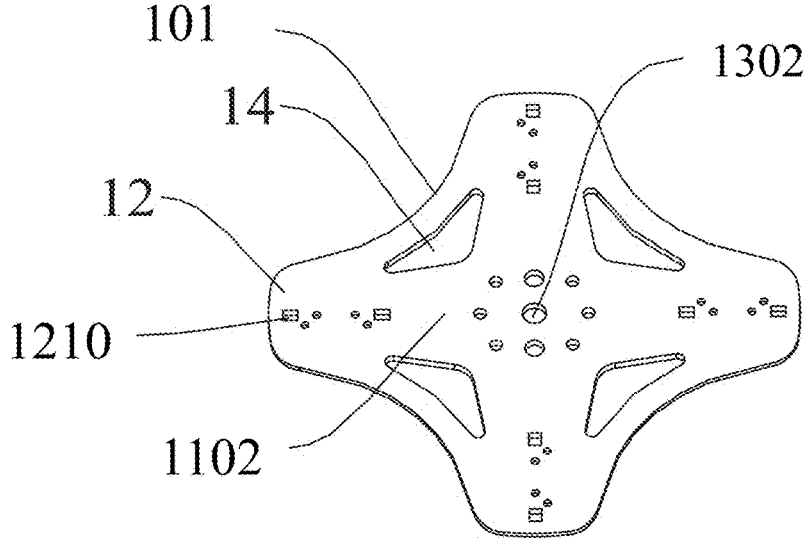
FIG. 14 is a structural schematic diagram of the bottom plate according to some implementations of the present disclosure.

As shown in FIG. 12, based on the same concept, the present disclosure also provides a mower 401 including the above quick-detach leaf suction cover, which is fastened to the cutter disc frame by a buckle.

Thus, the present disclosure discloses a quick-detach leaf suction cover and a mower. By installing and removing the cover body and the bottom plate, switching between mowing and leaf suction modes is achieved. The cooperation of the fastening part and the fastening groove enables quick installation and removal of the cover body and the bottom plate. The locking assembly ensures the firmness of the connection between the cover body and the bottom plate.

FIGS. 13 to 19 show implementations of the fan blade, leaf suction device, and mower of the present disclosure, including a bottom plate 101, a fan blade body 202, and a reinforcing member 302. The bottom plate 101 includes a fixed portion 1102 and a mounting portion 1202. The mounting portion 1202 extends outward along the end of the fixed portion 1102, and the width of the mounting portion 1202 is greater than that of the fixed portion 1102. The fan blade body 202 is arranged on the mounting portion 1202, and the reinforcing member 302 is arranged tightly against a side of the fan blade body 202 and is fixedly connected to the fan blade body 202.

In the present disclosure, by arranging the fan blade body 202 on the mounting portion 1202 with a larger width, and at the same time arranging the reinforcing member 302 tightly against a side of the fan blade body 202, the stress concentration area of the fan blade body 202 is reinforced, making the structure of the fan blade more stable and less prone to deformation.

The number of fan blade bodies 2 can be adjusted according to actual needs. In this implementation, there are four fan blade bodies 2, which are arranged around the bottom plate 101. The middle of the fixed portion 1102 is provided with a motor connecting hole 1302. The fan blade is connected to the output shaft of the motor through the motor connecting hole 1302, and the fan blade is driven to rotate by the motor. The bottom plate 101 is also provided with four hollow holes 14, which not only reduce the weight of the bottom plate 101 but also make it more aesthetically pleasing. The lower end of the fan blade body 202 is also provided with a positioning block 25, and the corresponding position on the mounting portion 1202 is provided with a positioning hole 1210. By snapping the positioning block 25 into the positioning hole 1210, the fan blade body 202 can be quickly positioned, and then fixedly connected to the mounting portion 1202 by screws.

Figure 16:
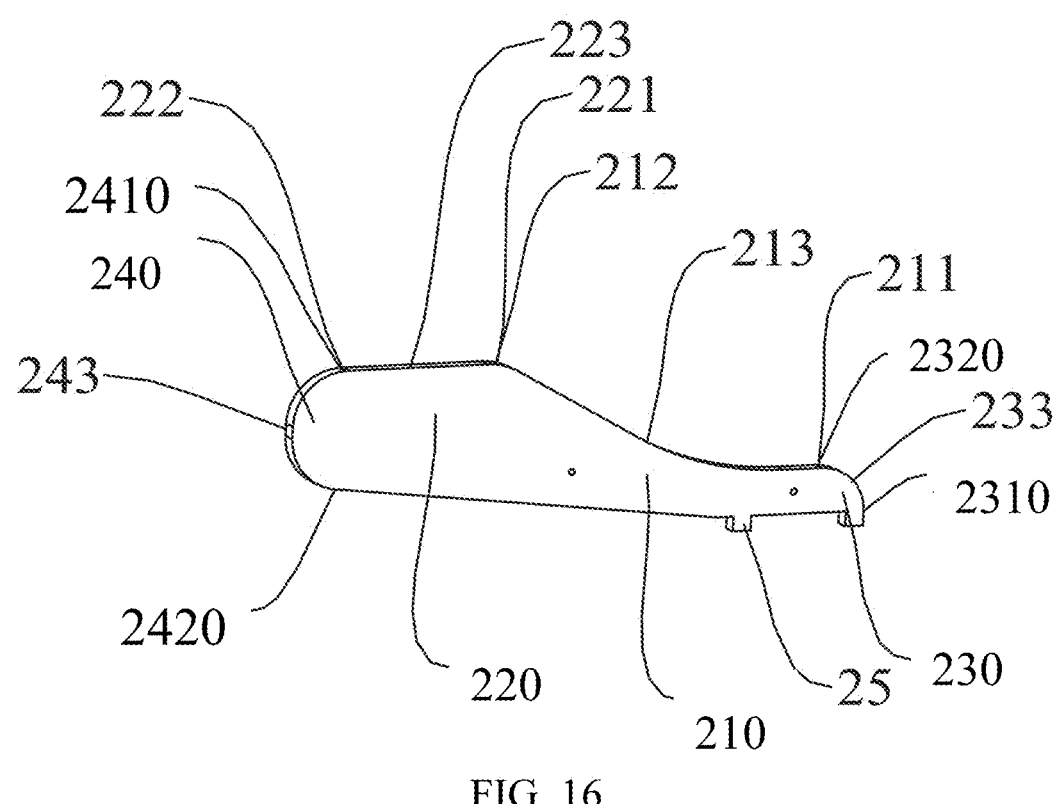
FIG. 16 is a structural schematic diagram of the reinforcing member according to some implementations of the present disclosure.

In some implementations, as shown in FIG. 16, the fan blade body 202 includes a first fan blade part 210 and a second fan blade part 220. A first end 211 of the first fan blade part 210 extends to a second end 212 of the first fan blade part 210 as an inwardly concave fifth arc 213. The second end 212 of the first fan blade part 210 is connected to a first end 221 of the second fan blade part 220. The first end 221 of the second fan blade part 220 extends to a second end 222 of the second fan blade part 220 as a downward inclined lower oblique line 223. By combining the upper end surface of the fan blade body 202 with the fifth arc 213 and the lower oblique line 223, the fan blade body 202 has less wind resistance and better centrifugal effect during rotation.

In some implementations, as shown in FIG. 16, the fan blade body 202 further includes a fan blade head 230 and a fan blade tail 240. A first end 2310 of the fan blade head 230 extends to a second end 2320 of the fan blade head 230 as an outwardly convex sixth arc 233. The second end 2320 of the fan blade head 230 is connected to the first end 211 of the first fan blade part 210. A first end 2410 of the fan blade tail 240 is connected to the second end 222 of the second fan blade part 220. The first end 2410 of the fan blade tail 240 extends to a second end 2420 of the fan blade tail 240 as an outwardly convex seventh arc 243. The arrangement of the fan blade head 230 and the fan blade tail 240 increases the structural stability of the fan blade body 202. The design of the sixth arc 233 and the seventh arc 243 respectively optimizes the structure of the front and rear ends of the fan blade body 202, reducing wind resistance during rotation and improving the centrifugal effect.

In some implementations, as shown in FIG. 16, the length of the fifth arc 213 is ½ to ⅗ of the length of the fan blade body 202, which can be ½ or ⅗. The length of the lower oblique line 223 is ⅛ to ¼ of the length of the fan blade body 202, which can be ⅛ or ¼. The length of the sixth arc 233 is 1/12 to ⅙ of the length of the fan blade body 202, which can be 1/12 or ⅙. The length of the seventh arc 243 is ⅙ to ¼ of the length of the fan blade body 202, which can be ⅙ or ¼.

It should be noted that the length range of each line on the fan blade body 202 is obtained by repeated aerodynamic simulation optimization. By limiting the length of each line within an appropriate range, the wind resistance of the fan blade body 202 during rotation is minimized, and the centrifugal effect is better.

The length of the reinforcing member 302 should not be too long or too short, but should be adapted to the length of the fan blade body 202. When the length of the reinforcing member 302 is too long, it will affect the rotation of the fan blade body 202. When the length of the reinforcing member 302 is too short, it cannot reinforce the stress concentration area.

Figure 15:
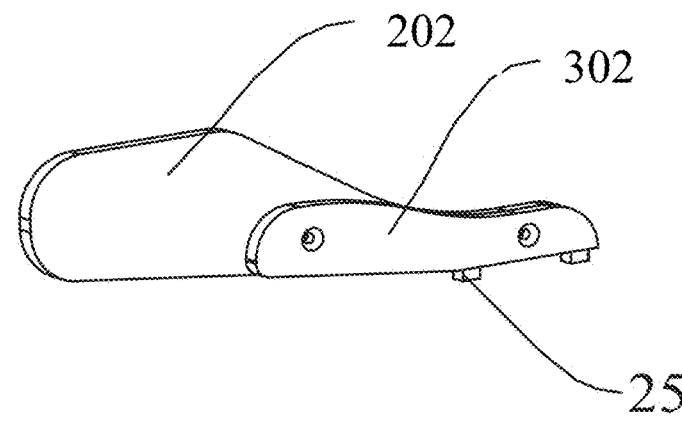
FIG. 15 is a structural schematic diagram of the fan blade body and reinforcing member according to some implementations of the present disclosure.

In some implementations, as shown in FIG. 15, the length of the reinforcing member 302 is ½ to ⅔ of the length of the fan blade body 202. The shape of the front part of the reinforcing member 302 matches the shape of the fan blade body 202. The reinforcing member 302 reinforces the fan blade body 202 without affecting its rotation.

Figure 17:
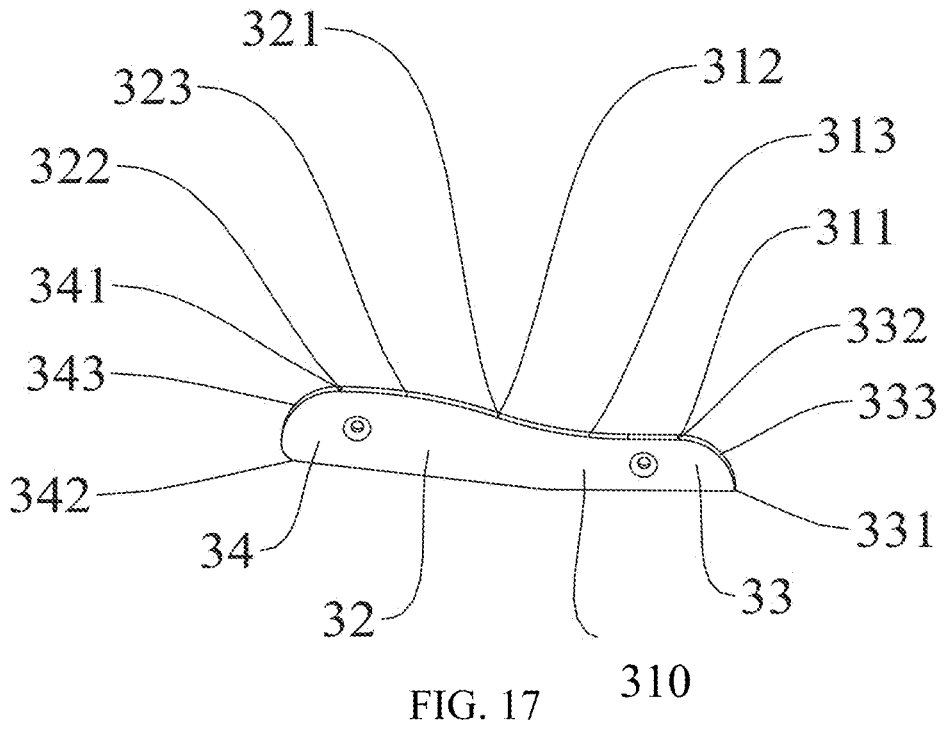
FIG. 17 is a structural schematic diagram of the fan blade body according to some implementations of the present disclosure.

In some implementations, as shown in FIG. 17, the reinforcing member 302 includes a first reinforcing part 310 and a second reinforcing part 32. A first end 311 of the first reinforcing part 310 extends to a second end 312 of the first reinforcing part 310 as an inwardly concave first arc 313. The second end 312 of the first reinforcing part 310 is connected to a first end 321 of the second reinforcing part 32. The first end 321 of the second reinforcing part 32 extends to a second end 322 of the second reinforcing part 32 as an outwardly convex second arc 323. By combining the upper end surface of the reinforcing member 302 with the first arc 313 and the second arc 323, the reinforcing member 302 has less wind resistance during rotation with the fan blade body 202, and the arc design of the reinforcing member 302 can also generate part of the centrifugal force during rotation, thereby assisting the rotation of the fan blade body 202.

In some implementations, as shown in FIG. 17, the reinforcing member 302 further includes a reinforcing head 33 and a reinforcing tail 34. A first end 331 of the reinforcing head 33 extends to a second end 332 of the reinforcing head 33 as an outwardly convex third arc 333. The second end 332 of the reinforcing head 33 is connected to the first end 311 of the first reinforcing part 310. A first end 341 of the reinforcing tail 34 is connected to the second end 322 of the second reinforcing part 32. The first end 341 of the reinforcing tail 34 extends to a second end 342 of the reinforcing tail 34 as an outwardly convex fourth arc 343. The arrangement of the reinforcing head 33 and the reinforcing tail 34 increases the structural stability of the reinforcing member 302. The design of the third arc 333 and the fourth arc 343 can reduce the wind resistance of the reinforcing member 302 during rotation, avoiding affecting the rotation of the fan blade body 202.

In some implementations, as shown in FIG. 17, the length of the first arc 313 is ⅖ to ½ of the length of the reinforcing member 302. The length of the second arc 323 is ⅓ to ½ of the length of the reinforcing member 302, which can be ⅓ or ½. The length of the third arc 333 is 1/10 to ⅕ of the length of the reinforcing member 302, which can be 1/10 or ⅕. The length of the fourth arc 343 is 1/10 to 3/10 of the length of the reinforcing member 302, which can be 1/10 or 3/10.

It should be noted that the length range of each arc on the reinforcing member 302 is obtained by repeated aerodynamic simulation optimization. By limiting the length of each arc within an appropriate range, the wind resistance of the reinforcing member 302 during rotation is minimized, avoiding affecting the rotation of the fan blade body 202.

Figure 18:
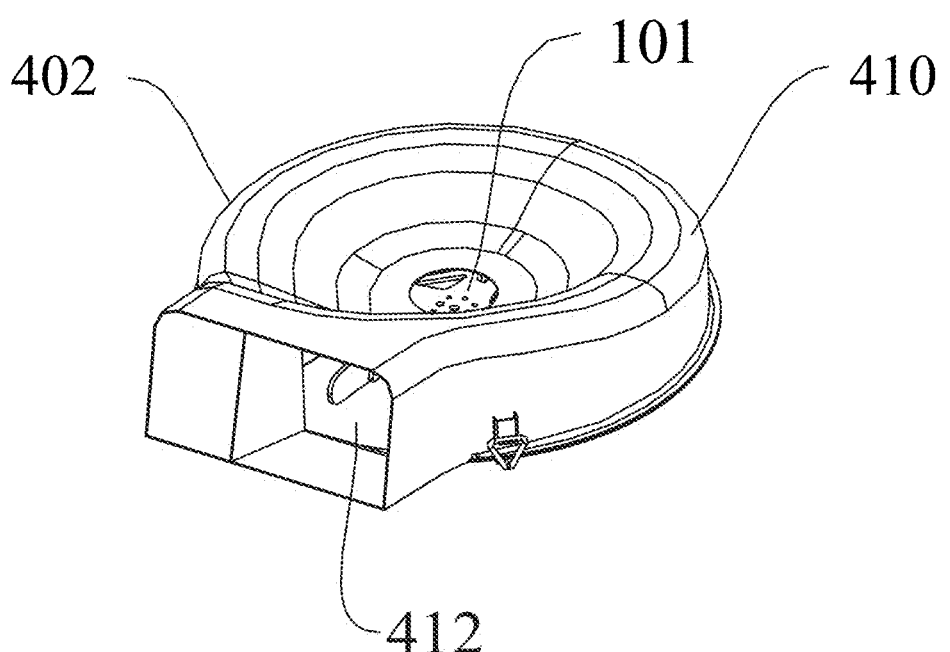
FIG. 18 is a structural schematic diagram of the leaf suction device according to some implementations of the present disclosure.
Figure 19:
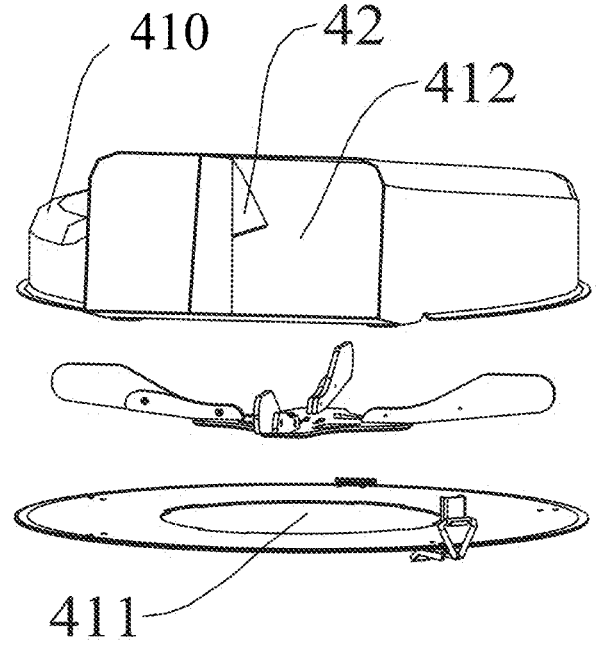
FIG. 19 is an exploded structural schematic diagram of the leaf suction device according to some implementations of the present disclosure.

Based on the same creative concept, the present disclosure also provides a leaf suction device 402, as shown in FIGS. 18 and 19, including the above fan blade. The leaf suction device 402 also includes a housing 410, the housing 410 being in a volute shape with a middle recessed inward. The housing 410 is adapted to the fan blade, and the fan blade is arranged within the housing 410. The housing 410 further includes a leaf inlet 411 and a leaf outlet 412. The leaf inlet 411 is arranged at the bottom of the housing 410, and the leaf outlet 412 is arranged on the side of the housing 410. The fan blade is configured to draw leaves in from the leaf inlet 411 and discharge them from the leaf outlet 412. The centrifugal force generated by the rotation of the fan blade draws the leaves in from the leaf inlet 411 at the bottom of the housing 410 and then discharges them from the leaf outlet 412, facilitating the collection of leaves.

The upper inside of the housing 410 adjacent to the leaf outlet 412 is provided with a leaf discharge auxiliary member 42, which extends from the leaf outlet 412 into the housing 410. The upper end of the leaf discharge auxiliary member 42 fits against the upper surface of the housing 410. The leaf discharge auxiliary member 42 is configured to assist the fan blade in discharging the leaves from the leaf outlet 412. By providing the leaf discharge auxiliary member 42 adjacent to the leaf outlet 412, the airflow turbulence at the leaf outlet 412 of the leaf suction device 402 is optimized, making it easier for the leaves to be discharged from the leaf outlet 412 after being drawn into the housing 410, and preventing the accumulation of leaves inside the housing 410.

Based on the same creative concept, the present disclosure also provides a mower including the above leaf suction device 402.

Thus, the present disclosure discloses a fan blade, a leaf suction device for a mower, and the mower, including a bottom plate, a fan blade body, and a reinforcing member. The bottom plate includes a fixed portion and a mounting portion. The mounting portion extends outward along the end of the fixed portion, and the width of the mounting portion is greater than that of the fixed portion. The fan blade body is arranged on the mounting portion, and the reinforcing member is arranged tightly against a side of the fan blade body and is fixedly connected to the fan blade body. By arranging the fan blade body on the mounting portion with a larger width, and at the same time arranging the reinforcing member tightly against a side of the fan blade body, the stress concentration area of the fan blade body is reinforced, making the structure of the fan blade more stable and less prone to deformation.

Implementation 1 is as follows.

Figure 20:
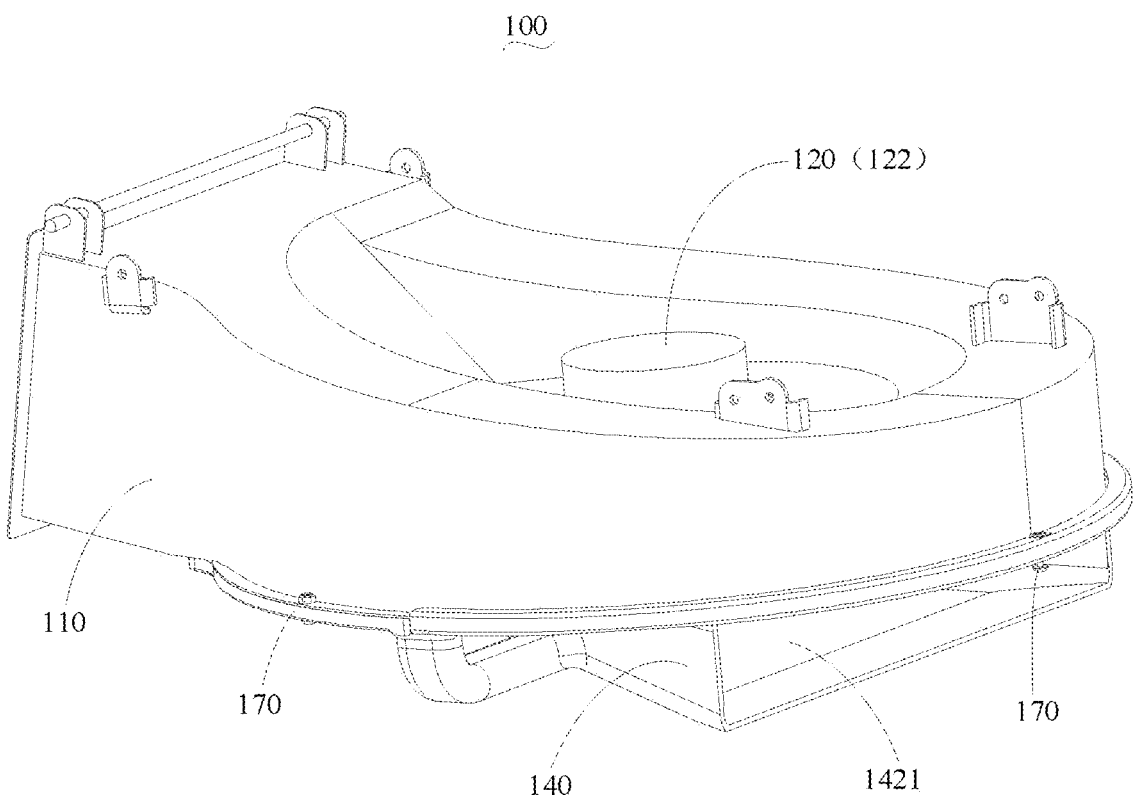
FIG. 20 is a perspective schematic diagram of the cutting mechanism provided in some implementations of the present disclosure.
Figure 21:
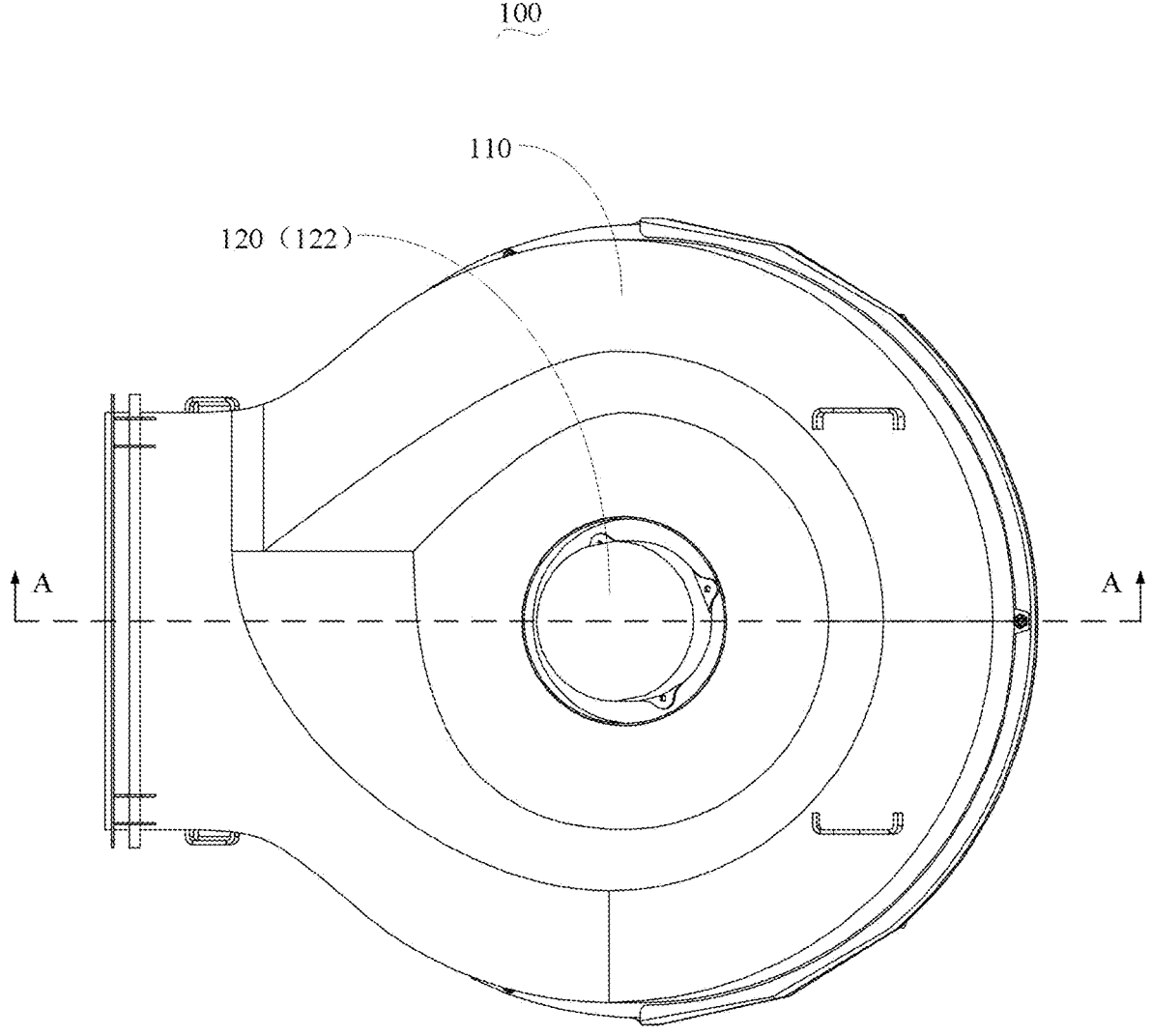
FIG. 21 is a top view schematic diagram of FIG. 20.
Figure 22:
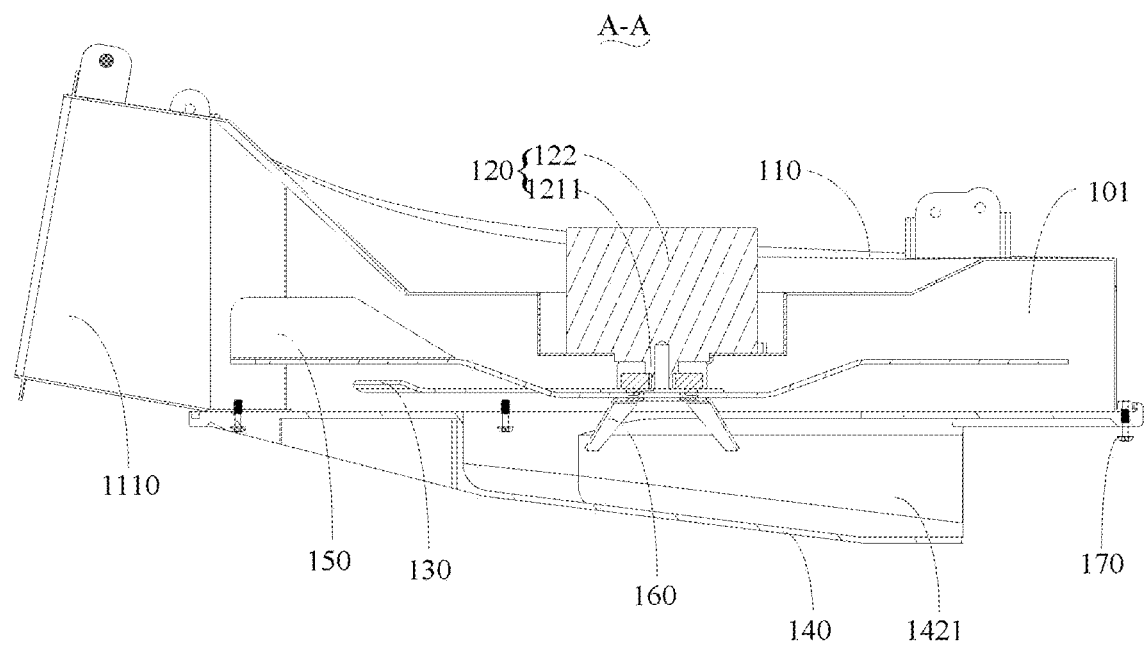
FIG. 22 is a sectional schematic diagram along A-A in FIG. 21.

As shown in FIGS. 20 to 22, Implementation 1 of the present disclosure provides a cutting mechanism 100, including a cutter disc 110, a power component 120, and a cutting knife 130. The power component 120 is mounted on the cutter disc 110, and the power component 120 has an output shaft 1211. The cutting knife 130 is connected to the output shaft 1211 for rotating under the drive of the output shaft 1211. The cutter disc 110 is the main supporting component of the cutting mechanism 100. The cutting knife 130 is the execution component of the cutting mechanism 100, and the power component 120 is configured to provide driving force for the movement of the cutting knife 130. In some implementations, when the power component 120 operates, the output shaft 1211 can drive the cutting knife 130 to rotate. When the cutting knife 130 rotates, it can perform the action of cutting plants.

Referring to FIGS. 22 and 23, in some implementations, the cutting mechanism 100 further includes a shroud 140 and a fan blade 150. The shroud 140 is detachably connected to the cutter disc 110 and encloses the cutter disc 110 to form an internal cavity 101. The output shaft 1211 at least partially extends into the internal cavity 101, that is, the power component 120 has an output shaft 1211 extending into the internal cavity 101. The cutting knife 130 is housed within the internal cavity 101 and is connected to the output shaft 1211 for rotating under the drive of the output shaft 1211. At least one of the cutter disc 110 or the shroud 140 forms a suction inlet 1421 communicating with the internal cavity 101. The fan blade 150 is housed within the internal cavity 101 and is detachably connected to the cutting knife 130 or the output shaft 1211. The fan blade 150 is configured to rotate under the drive of the output shaft 1211 to form a driving airflow from the suction inlet 1421 towards the internal cavity 101. The shroud 140 can be detachably connected to the cutter disc 110, and the fan blade 150 can be detachably connected to the cutting knife 130 or the output shaft 1211. The cutting mechanism 100 at least has a cutting working mode and a leaf suction working mode. In the cutting working mode, the shroud 140 and the cutter disc 110 are separated, the fan blade 150 and the cutting knife 130 are separated, and the fan blade 150 and the output shaft 1211 are separated, that is: the shroud 140 is not installed on the cutter disc 110, and the fan blade 150 is not installed on the cutting knife 130 and the output shaft 1211. The cutting knife 130 rotates under the drive of the power component 120 to perform the mowing action. In the leaf suction working mode, the shroud 140 is installed on the cutter disc 110, and the fan blade 150 is installed on the cutting knife 130 or the output shaft 1211. The fan blade 150 and the cutting knife 130 rotate under the drive of the power component 120. The rotation of the fan blade 150 can form a suction effect that draws fallen leaves or cut grass from the suction inlet 1421 into the internal cavity 101 to perform the action of clearing fallen leaves and cut grass from the ground. The rotation of the cutting knife 130 can shred the fallen leaves and cut grass drawn into the internal cavity 101 by the fan blade 150, thereby helping to reduce the space occupied by the fallen leaves and cut grass. In this implementation, by providing a detachable shroud 140 and fan blade 150, the cutting mechanism 100 not only has a cutting function but also a leaf suction and cut grass suction function, which helps to expand the application range of the cutting mechanism 100. In addition, since the leaf suction function and the cutting function share the same power component 120 for power, there is no need to provide an additional power mechanism for the leaf suction function, so the cutting mechanism 100 has the advantages of simple structure, low cost, and easy implementation.

Referring to FIGS. 20 and 23, in some implementations, the suction inlet 1421 is formed on the shroud 140, that is, the suction inlet 1421 is formed solely by the shroud 140. In this way, the leaf suction function can be added to the cutting mechanism 100 without modifying the structure of the cutter disc 110, which is easy to implement. Of course, in specific applications, the arrangement of the suction inlet 1421 is not limited to this. For example, as an alternative implementation, the suction inlet 1421 can also be formed by the shroud 140 and the cutter disc 110 together; or the suction inlet 1421 can also be formed solely on the cutter disc 110.

Referring to FIGS. 20 and 23, in some implementations, one end of the suction inlet 1421 is arranged towards the circumferential edge 1504 of the shroud 140. Compared with the scheme where the suction inlet 1421 faces down-ward, this arrangement has the following advantages: it can prevent the fallen leaves or cut grass drawn into the internal cavity 101 from falling back to the ground due to gravity.

Figure 24:
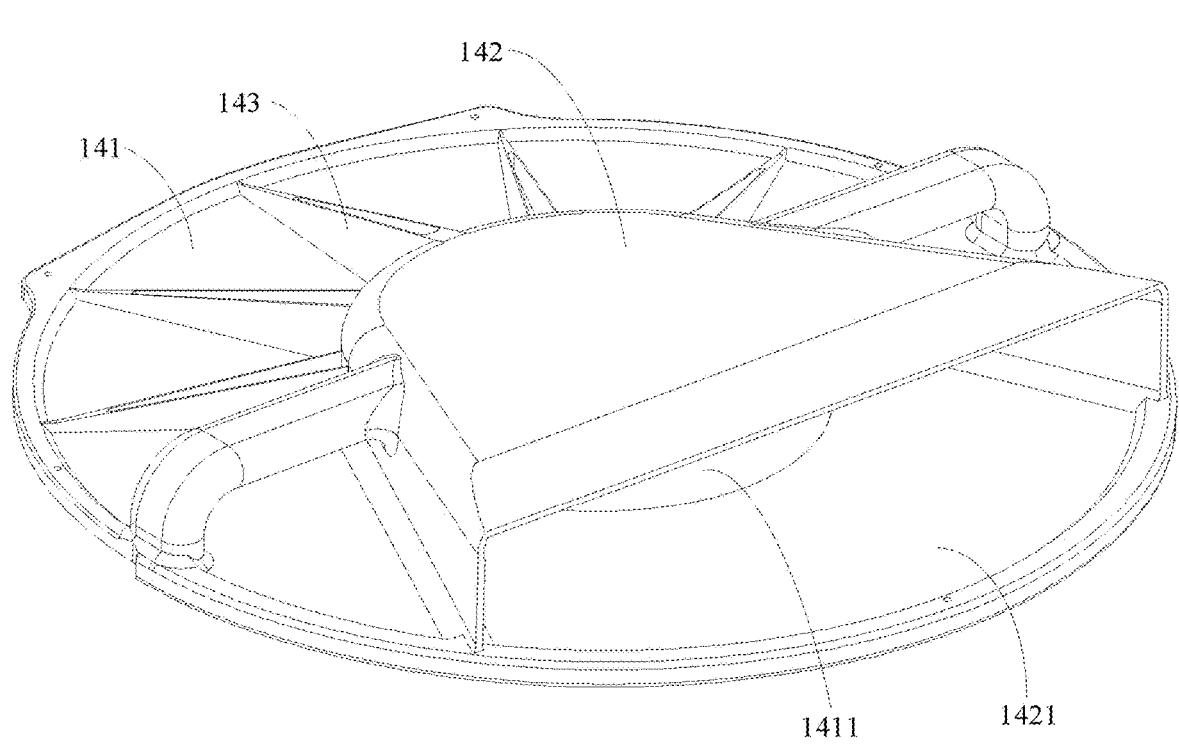
FIG. 24 is a perspective schematic diagram of the shroud provided in some implementations of the present disclosure.

Referring to FIGS. 22, 23, and 24, in some implementations, the shroud 140 includes a cover plate portion 141 and a guide cover portion 142. The cover plate portion 141 is configured to cover and connect the cutter disc 110, and the cover plate forms an air guide opening 1411 arranged opposite the output shaft 1211. The guide cover portion 142 protrudes from a side of the cover plate portion 141 facing away from the cutter disc 110, and the guide cover portion 142 covers the air guide opening 1411. The guide cover portion 142 forms the suction inlet 1421, and the suction inlet 1421 extends from a local outer edge of the cover plate portion 141 to the air guide opening 1411. The air guide opening 1411 extends in the vertical direction, and the suction inlet 1421 extends in the horizontal direction. In the leaf suction working mode, the wind force generated by the rotation of the fan blade 150 can draw fallen leaves and/or cut grass from the suction inlet 1421 and then enter the internal cavity 101 through the air guide opening 1411. The cover plate portion 141 is mainly configured to connect the shroud 140 to the cutter disc 110. The guide cover portion 142 is mainly configured to prevent the fallen leaves or cut grass drawn into the internal cavity 101 from falling back to the ground due to gravity.

Referring to FIG. 24, in some implementations, the shroud 140 further includes a reinforcing rib 143. The reinforcing rib 143 connects the guide cover portion 142 and the cover plate portion 141 to ensure the structural strength of the shroud 140.

In some implementations, the shroud 140 includes at least two reinforcing ribs 143, and the at least two reinforcing ribs 143 are distributed at intervals along the circumferential direction of the cover plate portion 141.

In some implementations, the shroud 140 is detachably connected to the cutter disc 110 by screws 170, and the screws are securely fastened. The shroud 140 is provided with a first connecting hole, and the cutter disc is provided with a second connecting hole. Both the first connecting hole and the second connecting hole are through holes. The screw includes a screw rod that passes through the first connecting hole and the second connecting hole in sequence and a nut threadedly connected to the screw rod. Of course, in specific applications, the arrangement of the first connecting hole and the second connecting hole is not limited to this. For example, as an alternative implementation, one of the first connecting hole and the second connecting hole is a threaded hole, and the other is a through hole. The screw includes a screw rod that passes through the through hole and is connected to the threaded hole.

In some implementations, the shroud 140 is detachably connected to the cutter disc 110 by multiple screws 170.

In some implementations, the connection method between the shroud 140 and the cutter disc 110 is: the shroud 140 is covered on the cutter disc 110 by the cooperation of a flange and a slot, and then locked to the cutter disc 110 by screws.

Figure 26:
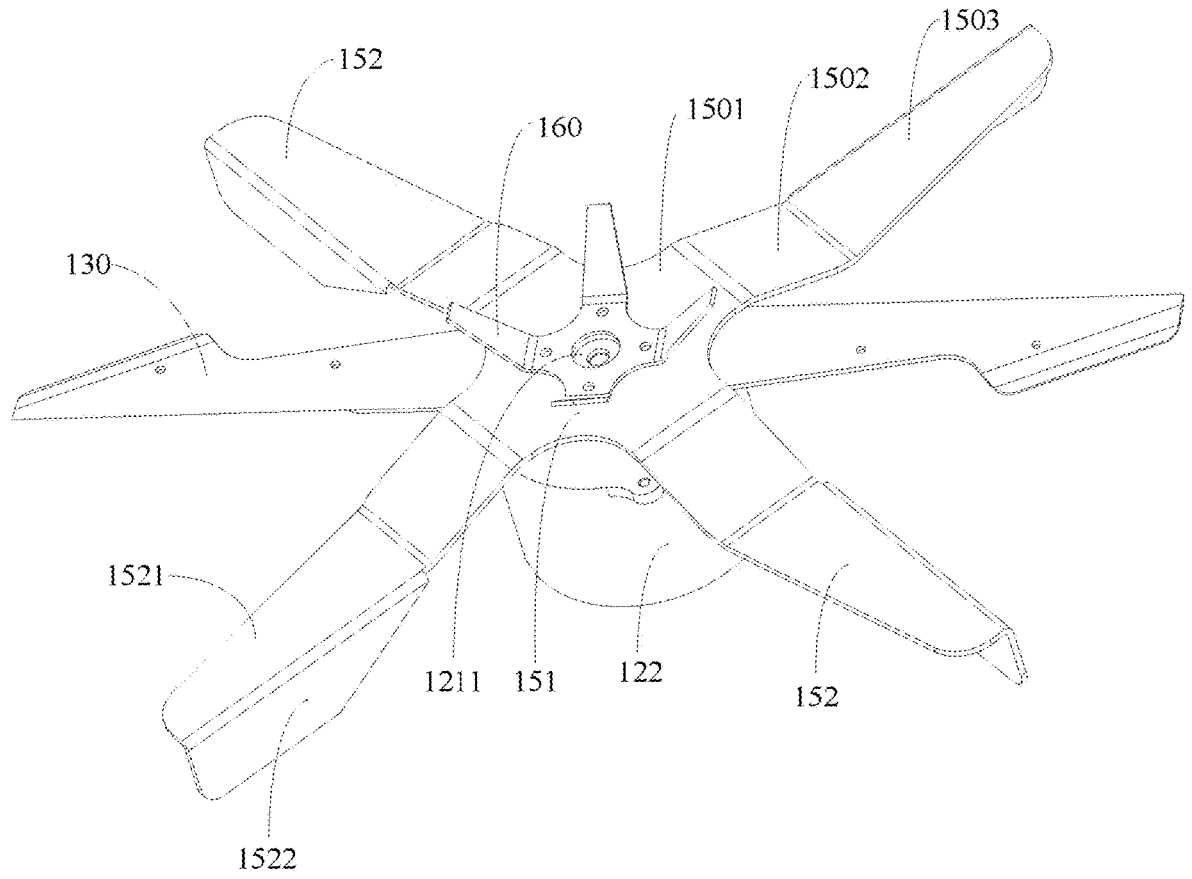
FIG. 26 is an assembly schematic diagram of the power component, cutting knife, fan blade, and shredding knife from another perspective provided in some implementations of the present disclosure.

Referring to FIGS. 22, 23, and 26, in some implementations, the power component 120 further includes a main body portion 122. The main body portion 122 and the cutting knife 130 are respectively arranged on opposite sides of the cutter disc 110, and the output shaft 1211 extends from the main body portion 122 through the cutter disc 110 and is connected to the cutting knife 130.

In some implementations, the main body portion 122 is arranged on the top of the cutter disc 110, and the cutting knife 130 is arranged on the bottom of the cutter disc 110.

In some implementations, the power component 120 includes a motor and a transmission component. The transmission component is connected between the motor and the cutting knife 130. The transmission component includes at least one of a reduction gearbox, a gear transmission pair, a belt transmission pair, and a chain transmission pair. Of course, in specific applications, as an alternative implementation, the arrangement of the power component 120 is not limited to this. For example, as an alternative implementation, the power component 120 can also include only a motor without a transmission component.

In some implementations, the fan blade 150 is arranged axially along the output shaft 1211 on the side of the cutting knife 130 facing away from the power component 120.

In some implementations, the fan blade 150 is detachably connected to the cutting knife 130 by screws. In this way, the fan blade 150 can be installed without modifying the output shaft 1211 of the power component 120. Of course, in specific applications, the installation method of the fan blade 150 is not limited to this. For example, as an alternative implementation, the fan blade 150 can also be sleeved and connected to the output shaft 1211; or, as another alternative implementation, the fan blade 150 can also be rotatably mounted on the shroud 140 by a bearing, and the fan blade 150 and the shroud 140 form a component that is installed together on the cutter disc 110. When this component is installed on the cutter disc 110, the fan blade 150 cooperates with the cutting knife 130 or the output shaft 1211, so that the fan blade 150 can rotate relative to the shroud 140 under the drive of the cutting knife 130 or the output shaft 1211. In this alternative implementation, the fan blade 150 and the shroud 140 are integrated as a component for simultaneous installation and removal, which facilitates later disassembly and maintenance by the operator.

Figure 25:
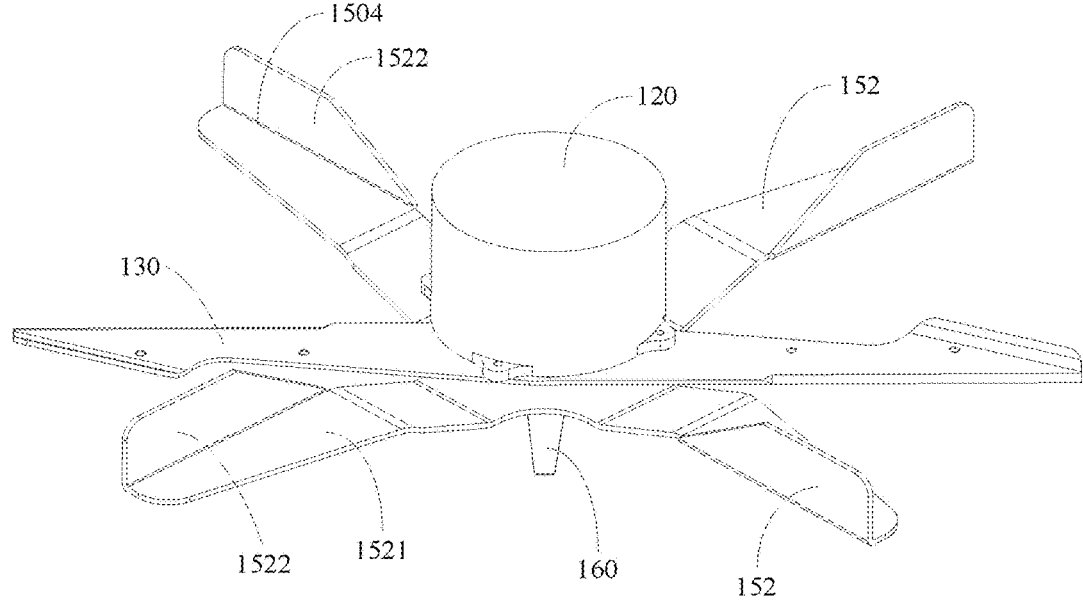
FIG. 25 is an assembly schematic diagram of the power component, cutting knife, fan blade, and shredding knife from one perspective provided in some implementations of the present disclosure.

Referring to FIGS. 23, 25, and 26, in some implementations, the fan blade 150 includes a main connecting portion 151 and at least two blades 152. The main connecting portion 151 is detachably connected to the cutting knife 130. The at least two blades 152 are distributed at intervals along the circumference of the main connecting portion 151. Each blade 152 protrudes radially from the outer side of the main connecting portion 151. The main connecting portion 151 is mainly configured for the installation of the fan blade 150. The blades 152 are mainly configured to generate wind force under power drive. The number of blades 152 is set to at least two, which helps to ensure the balance of the structure of the fan blade 150.

In some implementations, the fan blade 150 includes four blades 152, which are evenly distributed at intervals along the circumference of the main connecting portion 151. Of course, in specific applications, the number of blades 152 is not limited to this. For example, as an alternative implementation, the number of blades 152 can also be two, three, five, or even more.

Referring to FIGS. 23, 25, and 26, in some implementations, each blade 152 includes a radial extension portion 1521 and an axial extension portion 1522. The radial extension portion 1521 extends along the radial direction of the output shaft 1211 from the outer side of the main connecting portion 151 towards a direction away from the center of the fan blade 150. The radial extension portion 1521 has two circumferential edges 1504 arranged opposite each other along the circumferential direction of the cutter disc 110. The axial extension portion 1522 extends along the axial direction of the cutter disc 110 from a local circumferential edge 1504 of the radial extension portion 1521 towards the cutting knife 130. In this implementation, by dividing the blade 152 into a radial extension portion 1521 and an axial extension portion 1522, and the radial extension portion 1521 extends radially outward from the main connecting portion 151, and the axial extension portion 1522 is bent and arranged at a local circumferential edge 1504 of the radial extension portion 1521, this helps to increase the contact area between the blade 152 and the air, and helps to improve the air-driving performance of the fan blade 150. In this implementation, the axial extension portion 1522 is not arranged along the entire circumferential edge 1504 of the radial extension portion 1521, which at least reduces the weight of the fan blade 150, thereby helping to reduce the load on the power component 120.

In some implementations, the axial extension portion 1522 extends from the circumferential edge 1504 away from the main connecting portion 151 along the axial direction of the output shaft 1211, that is, the axial extension portion 1522 is arranged at the radial end of the circumferential edge 1504. This arrangement helps to further optimize the air-driving performance of the fan blade 150.

Referring to FIGS. 23, 25, and 26, in some implementations, the radial extension portion 1521 includes a first extension portion 1501, a second extension portion 1502, and a third extension portion 1503. The first extension portion 1501, the second extension portion 1502, and the third extension portion 1503 are sequentially connected along the radial direction of the cutter disc 110 from the main connecting portion 151 towards a direction away from the center of the fan blade 150. The first extension portion 1501 and the third extension portion 1503 are parallel to each other. The second extension portion 1502 extends obliquely from the first extension portion 1501 to the third extension portion 1503 with a trend of gradually approaching the cutter disc 110. The axial extension portion 1522 is arranged at a local circumferential edge 1504 formed by the third extension portion 1503. In this implementation, the oblique arrangement of the second extension portion 1502 helps to further increase the contact area between the blade 152 and the air, thereby helping to further optimize the air-driving performance of the fan blade 150 within an effective space.

In some implementations, the main connecting portion 151, the first extension portion 1501, and the third extension portion 1503 are all arranged horizontally. The axial extension portion 1522 and the output shaft 1211 are arranged vertically. The second extension portion 1502 is arranged obliquely relative to both the horizontal and vertical directions.

Referring to FIGS. 22, 23, and 27, in some implementations, at least one of the cutter disc 110 or the shroud 140 further forms a discharge port 1110 communicating with the internal cavity 101. The fan blade 150 is also configured to rotate under the drive of the output shaft 1211 to form a driving airflow from the internal cavity 101 towards the discharge port 1110. In the leaf suction working mode, the wind force generated by the rotation of the fan blade 150 is also configured to deliver the fallen leaves and/or cut grass in the internal cavity 101 to the discharge port 1110. The discharge port 1110 is configured to communicate with a collection component, and the collection component is configured to collect the fallen leaves or cut grass discharged from the discharge port 1110. The collection component can be a collection bag or a collection box.

In some implementations, the discharge port 1110 is formed on the cutter disc 110, that is, the discharge port 1110 is formed solely by the cutter disc 110. Of course, in specific applications, as an alternative implementation, the discharge port 1110 can also be formed by the cutter disc 110 and the shroud 140 together; or the discharge port 1110 can also be formed solely on the shroud 140.

Referring to FIGS. 22, 23, and 27, in some implementations, the cutter disc 110 forms a concave cavity 1120, the concave cavity 1120 being enclosed by a cavity top wall and a cavity side wall. The top end of the cavity side wall is connected to the edge of the cavity top wall, and the bottom end of the cavity side wall encloses to form a cavity opening. The discharge port 1110 forms a part of the cavity side wall, and the shroud 140 can be detachably covered at the cavity opening to enclose with the concave cavity 1120 to form the internal cavity 101. Specifically, the concave cavity 1120 is formed by recessing upward from the bottom of the cutter disc 110. The motor is mounted on the top of the cavity top wall, and the output shaft 1211 passes through the cavity top wall and is connected to the cutting knife 130. In this implementation, the cutting knife 130 is housed within the concave cavity 1120, which helps to improve the safety of using the cutting mechanism 100.

Referring to FIGS. 22, 23, and 25, in some implementations, the cutting mechanism 100 further includes a shredding knife 160. The shredding knife 160 is housed within the internal cavity 101 and is detachably connected to at least one of the fan blade 150, the cutting knife 130, or the output shaft 1211 for rotating under the drive of the output shaft 1211. The design of the shredding knife 160 enables the cutting mechanism 100 to also have the function of shredding grass and leaves, thereby helping to reduce the volume of fallen leaves and cut grass and facilitating their collection. Since the shredding knife 160, the cutting knife 130, and the fan blade 150 share the same power component 120 for power, there is no need to provide an additional power mechanism for the shredding knife 160, so the cutting mechanism 100 has the advantages of simple structure, low cost, and easy implementation.

In some implementations, in the cutting working mode, the shredding knife 160 is separated from the cutting mechanism 100, that is, the shredding knife 160 is not installed on the cutting mechanism 100. In the leaf suction working mode, the shroud 140 is installed on the cutter disc 110, and the shredding knife 160 and the fan blade 150 are installed on the cutting knife 130 or the output shaft 1211. The shredding knife 160, the fan blade 150, and the cutting knife 130 rotate under the drive of the power component 120. The rotation of the fan blade 150 can form a suction effect that draws fallen leaves or cut grass from the suction inlet 1421 into the internal cavity 101 to perform the action of clearing fallen leaves and cut grass from the ground. The rotation of the shredding knife 160 and the cutting knife 130 can shred the fallen leaves and cut grass drawn into the internal cavity 101 by the fan blade 150.

In some implementations, the cutting mechanism 100 also has a shredding working mode. In the shredding working mode, the shroud 140 and the fan blade 150 are not installed on the cutting mechanism 100, and the shredding knife 160 and the cutting knife 130 are installed on the cutting mechanism 100. The shredding knife 160 and the cutting knife 130 rotate under the drive of the power component 120, and the rotation of the shredding knife 160 and the cutting knife 130 can shred fallen leaves and/or grass. Of course, in specific applications, as an alternative implementation, in the shredding working mode, the cutting knife 130 may not be installed on the output shaft 1211, and the shredding knife 160 is installed alone on the cutting mechanism 100. The shredding knife 160 rotates alone under the drive of the power component 120 to shred fallen leaves and/or grass.

Referring to FIGS. 22, 23, and 26, in some implementations, the shredding knife 160 is arranged axially along the output shaft 1211 on the side of the fan blade 150 facing away from the cutting knife 130. In the leaf suction working mode, the fallen leaves and/or cut grass drawn into the internal cavity 101 are first shredded by the shredding knife 160 and then further shredded by the cutting knife 130, so that the fallen leaves and cut grass drawn into the internal cavity 101 can be cut into smaller pieces.

In some implementations, the radial dimension of the shredding knife 160 is smaller than that of the cutting knife 130.

In some implementations, the shredding knife 160 and the fan blade 150 are detachably connected to the cutting knife 130 by screws. Of course, in specific applications, the installation method of the shredding knife 160 is not limited to this. For example, as an alternative implementation, the shredding knife 160 can also be connected to the fan blade 150 by screws alone, or the shredding knife 160 can be sleeved and connected to the output shaft 1211, or the shredding knife 160 can be rotatably mounted on the shroud 140 by a bearing.

In some implementations, the cutting mechanism 100 further includes a blocking component (not shown in the drawings). The blocking component can be detachably mounted at the discharge port 1110 to block the discharge port 1110. In the cutting working mode and the leaf suction working mode, the blocking component is separated from the discharge port 1110, that is, the blocking component does not block the discharge port 1110, and the fallen leaves and/or cut grass can be discharged from the discharge port 1110. In the shredding working mode, the blocking component is installed at the discharge port 1110 and blocks the discharge port 1110, so that the grass cut by the cutting mechanism 100 will not be discharged from the discharge port 1110, which helps the cutting mechanism 100 to perform the shredding action better.

Referring to FIGS. 20, 23, and 28, this implementation also provides a mower 10, which includes a machine body 200, a walking mechanism 300, a controller 400, and the above cutting mechanism 100. The cutting mechanism 100, the walking mechanism 300, and the controller 400 are respectively mounted on the machine body 200. The controller 400 is electrically connected to the cutting mechanism 100 and the walking mechanism 300, respectively, to control the operation of the cutting mechanism 100 and the walking mechanism 300. The mower 10 is supported on the ground by the walking mechanism 300 and walks on the ground. The cutting mechanism 100 is configured for mowing and leaf suction. The controller 400 controls the operation of the walking mechanism 300 and the cutting mechanism 100. Since the mower 10 of this implementation adopts the above cutting mechanism 100, the functions of the mower 10 are increased, which helps to expand the application scenarios of the mower 10.

In some implementations, the walking mechanism 300 includes at least two moving wheels, and at least one moving wheel is a driving wheel.

Implementation 2 is as follows.

Figure 29:
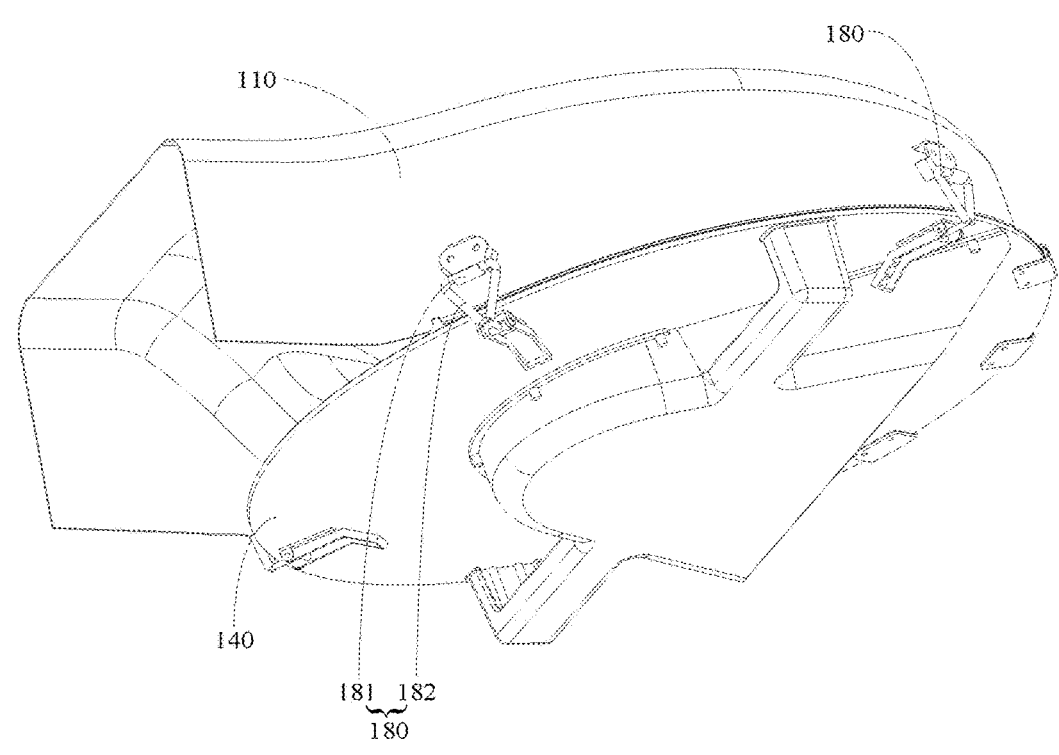
FIG. 29 is a perspective schematic diagram of the cutting mechanism provided in other implementations of the present disclosure.
Figure 30:
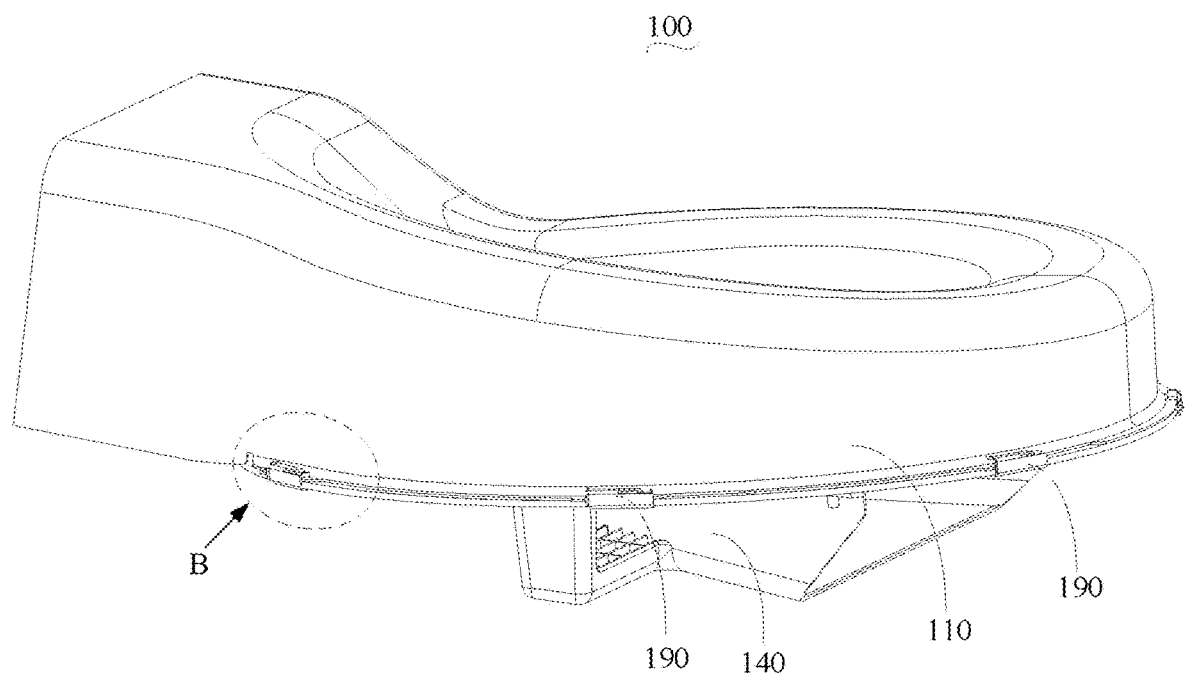
FIG. 30 is a perspective schematic diagram of the cutting mechanism provided in still other implementations of the present disclosure.
Figure 31:
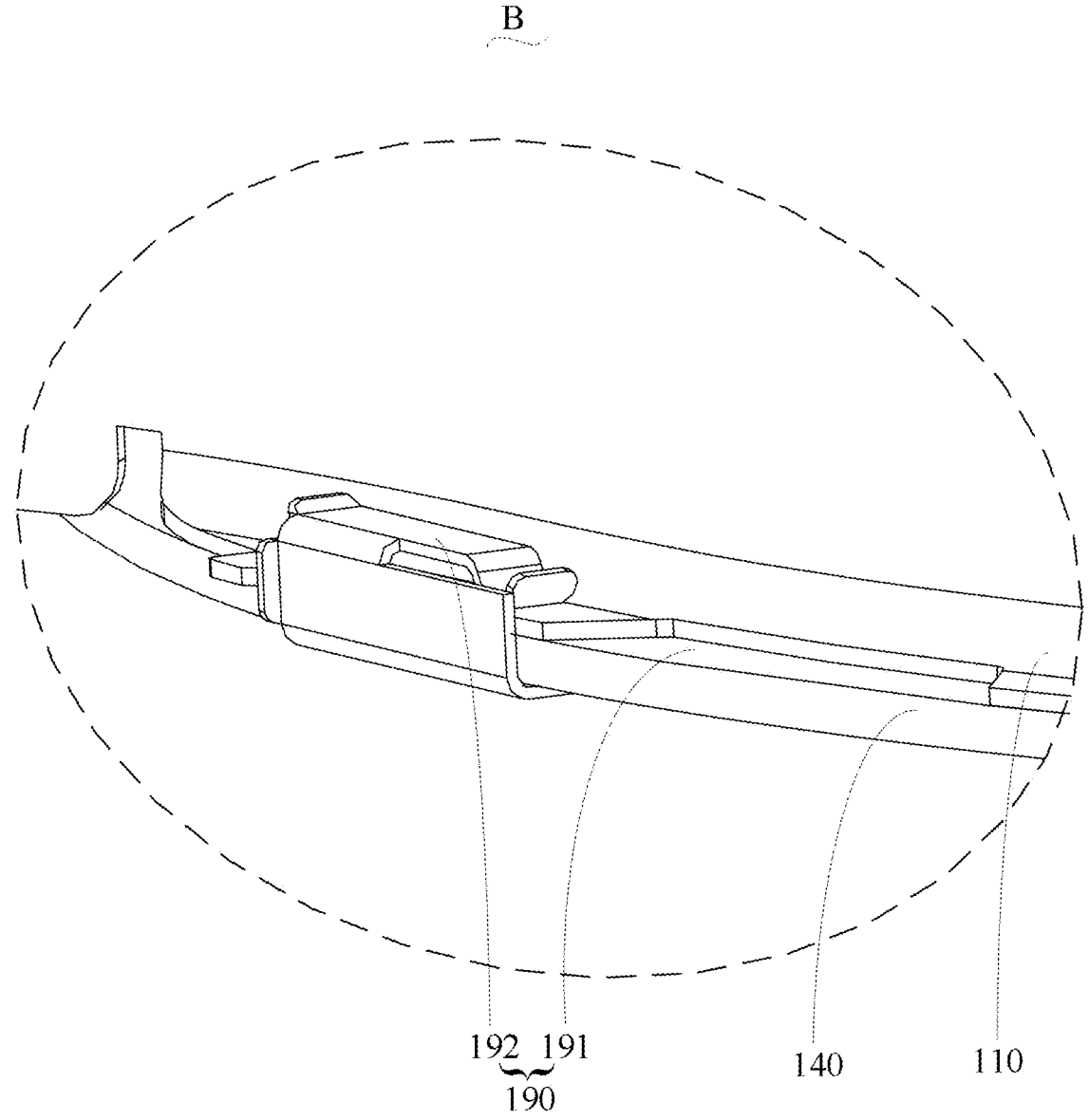
FIG. 31 is a partially enlarged schematic diagram at B in FIG. 30.

Referring to FIGS. 20, 28, and 29, the cutting mechanism 100 and the mower 10 provided in this implementation are mainly different from Implementation 1 in that the detachable connection method between the shroud 140 and the cutter disc 110 is different.

Specifically, in this implementation, the shroud 140 is detachably connected to the cutter disc 110 by a flip-type buckle structure 180. The flip-type buckle structure 180 includes a hook 181 and a clasp 182 for engaging with the hook 181. One of the shroud 140 or the cutter disc 110 is provided with the hook 181, and the other is rotatably connected with the clasp 182. The assembly method of the shroud 140 and the cutter disc 110 is: after the shroud 140 is covered on the cutter disc 110, the clasp 182 is flipped to engage with the hook 181, thereby locking the shroud 140 and the cutter disc 110. In this implementation, the assembly of the shroud 140 and the cutter disc 110 can be completed by hand without any auxiliary tools (such as a screwdriver or wrench).

In some implementations, the hook 181 is provided on the cutter disc 110, and the clasp 182 is provided on the shroud 140. Of course, in specific applications, as an alternative implementation, the hook 181 can be provided on the shroud 140, and the clasp 182 can be provided on the cutter disc 110.

In some implementations, the shroud 140 is detachably connected to the cutter disc 110 by multiple flip-type buckle structures 180.

Except for the above differences, other parts of the cutting mechanism 100 and the mower 10 provided in this implementation can refer to Implementation 1 and will not be described in detail here.

Implementation 3 is as follows.

Referring to FIGS. 20, 28, 30, and 31, the cutting mechanism 100 and the mower 10 provided in this implementation are mainly different from Implementation 1 in that the detachable connection method between the shroud 140 and the cutter disc 110 is different.

Specifically, in this implementation, the shroud 140 is detachably connected to the cutter disc 110 by a rotary buckle structure 190. The rotary buckle structure 190 includes a slot 191 and an elastic rotary buckle 192 for rotating and clamping in the slot 191. One of the shroud 140 or the cutter disc 110 is provided with the slot 191, and the other is provided with the elastic rotary buckle 192. The assembly method of the shroud 140 and the cutter disc 110 is: after the shroud 140 is covered on the cutter disc 110, the shroud 140 is rotated, and when the elastic rotary buckle 192 rotates into the slot 191, the shroud 140 and the cutter disc 110 are locked. In this implementation, the assembly of the shroud 140 and the cutter disc 110 can be completed by hand without any auxiliary tools (such as a screwdriver or wrench).

In some implementations, the slot 191 is provided on the cutter disc 110, and the elastic rotary buckle 192 is provided on the shroud 140. Of course, in specific applications, as an alternative implementation, the slot 191 can be provided on the shroud 140, and the elastic rotary buckle 192 can be provided on the cutter disc 110.

In some implementations, the shroud 140 is detachably connected to the cutter disc 110 by multiple rotary buckle structures 190.

Except for the above differences, other parts of the cutting mechanism 100 and the mower 10 provided in this implementation can refer to Implementation 1 and will not be described in detail here.

Of course, in specific applications, the detachable connection method between the shroud 140 and the cutter disc 110 is not limited to the methods of Implementation 1, Implementation 2, and Implementation 3 described above. For example, as an alternative implementation, the shroud 140 can be detachably connected to the cutter disc 110 by a plug-in buckle structure. The plug-in buckle structure includes a plug slot and an elastic protruding buckle for plug-in engagement with the plug slot. One of the shroud

140 or the cutter disc 110 is provided with the plug slot, and the other is provided with the elastic protruding buckle. When the shroud 140 is covered on the cutter disc 110, the elastic protruding buckle is plugged into the plug slot, thereby connecting the shroud 140 and the cutter disc 110. Or, as another alternative implementation, the shroud 140 can be detachably connected to the cutter disc 110 by screws 170 and a buckle.

The above are only some implementations of the present disclosure and do not limit the scope of the present disclosure. Any equivalent structural changes made under the concept of the present disclosure, or direct/indirect application in other related technical fields, are included in the scope of patent protection of the present disclosure.

What is claimed is:

1. A cutting mechanism, comprising:
    a cutter disc;
    a shroud, detachably connected to the cutter disc and enclosing the cutter disc to form an internal cavity, at least one of the cutter disc or the shroud forming a suction inlet communicating with the internal cavity, and the suction inlet being arranged at a circumferential edge of the shroud;
    a power component, mounted on the cutter disc and provided with an output shaft extending into the internal cavity;
    a cutting knife, housed within the internal cavity and connected to the output shaft for rotation under a drive of the output shaft; and
    a fan blade, housed within the internal cavity and detachably connected to the cutting knife or the output shaft, the fan blade being configured to rotate under the drive of the output shaft to form a driving airflow from the suction inlet towards the internal cavity,
    wherein:
    a rotation axis of the power component passes through a center portion of the cutting knife and a center portion of the fan blade to arrange the center portion of the cutting knife closer to the power component than the center portion of the fan blade; and
    the cutting knife and the fan blade are circumferentially staggered with respect to each other about the rotation axis of the power component.

2. The cutting mechanism according to claim 1, wherein the suction inlet is formed by the shroud.

3. The cutting mechanism according to claim 1, wherein:
    the fan blade comprises a main connecting portion, located at the center portion of the fan blade, detachably connected to the cutting knife, and at least two blades; and
    the at least two blades are distributed at intervals along a circumference of the main connecting portion.

4. The cutting mechanism according to claim 1, wherein:
    the at least one of the cutter disc or the shroud is further configured to form a discharge port configured to communicate with the internal cavity; and
    the fan blade is configured to rotate under the drive of the output shaft to form a driving airflow from the internal cavity towards the discharge port.

5. The cutting mechanism according to claim 1, further comprising:
    a shredding knife housed within the internal cavity and arranged along an axial direction of the output shaft on a side of the fan blade facing away from the cutting knife, wherein the shredding knife is detachably connected to at least one of the fan blade, the cutting knife, or the output shaft, for rotating under the drive of the output shaft.

6. The cutting mechanism according to claim 3, wherein: the main connecting portion of the fan blade is detachably connected to the cutting knife at a side of the cutting knife away from the power component.

7. The cutting mechanism according to claim 3, wherein: one of the at least two blades is bent and extends toward the power component.

8. The cutting mechanism according to claim 3, wherein: a portion of the cutting knife is arranged between the at least two blades of the fan blade.

9. The cutting mechanism according to claim 4, wherein: the discharge port is arranged at another circumferential edge of the shroud opposite the circumferential edge of the shroud where the suction inlet is formed.

10. The cutting mechanism according to claim 5, wherein: the rotation axis of the power component passes through the center portion of the cutting knife, the center portion of the fan blade, and a center portion of the shredding knife in sequence.

11. The cutting mechanism according to claim 5, wherein: the shredding knife comprises at least one knife blade extending away from the power component.

12. The cutting mechanism according to claim 5, wherein: a radial dimension of the shredding knife is less than a radial dimension of the cutting knife.

13. The cutting mechanism according to claim 12, wherein: a diameter dimension of the fan blade is greater than a diameter dimension of the cutting knife.

14. The cutting mechanism according to claim 1, further comprising: a plurality of rotary buckle structures arranged at a periphery of the cutter disc to detachably connect the cutter disc and the shroud.

15. The cutting mechanism according to claim 1, wherein: a diameter dimension of the fan blade is greater than a diameter dimension of the cutting knife.

* * * * *